US00RE47889E

(19) United States
(12) Reissued Patent
Saund

(10) Patent Number: US RE47,889 E
(45) Date of Reissued Patent: Mar. 3, 2020

(54) SYSTEM AND METHOD FOR SEGMENTING TEXT LINES IN DOCUMENTS

(71) Applicant: III Holdings 6, LLC, Wilmington, DE (US)

(72) Inventor: Eric Saund, San Carlos, CA (US)

(73) Assignee: III Holdings 6, LLC, Wilmington, DE (US)

(21) Appl. No.: 15/200,351

(22) Filed: Jul. 1, 2016

Related U.S. Patent Documents

Reissue of:
(64) Patent No.: 8,768,057
Issued: Jul. 1, 2014
Appl. No.: 13/677,473
Filed: Nov. 15, 2012

U.S. Applications:
(62) Division of application No. 12/500,882, filed on Jul. 10, 2009, now Pat. No. 8,649,600.

(51) Int. Cl.
*G06K 9/34* (2006.01)
*G06K 9/00* (2006.01)

(52) U.S. Cl.
CPC ..... *G06K 9/00456* (2013.01); *G06K 9/00442* (2013.01); *G06K 9/00449* (2013.01); *G06K 9/346* (2013.01)

(58) Field of Classification Search
CPC ..... G06K 9/00449; G06K 9/00442; G06K 9/00456; G06K 9/346
USPC ..... 382/175, 179
See application file for complete search history.

(56) References Cited

U.S. PATENT DOCUMENTS 5,181,255 A 1/1993 Bloomberg
5,201,011 A 4/1993 Bloomberg et al.
5,202,933 A * 4/1993 Bloomberg ..... 382/176
5,369,714 A 11/1994 Withgott et al.
5,570,435 A * 10/1996 Bloomberg et al. ..... 382/283
5,778,092 A 7/1998 MacLeod et al.
5,852,676 A * 12/1998 Lazar ..... G06K 9/00456 382/138
5,892,842 A * 4/1999 Bloomberg ..... 382/173
5,953,451 A * 9/1999 Syeda-Mahmood ..... G06F 17/30259 382/187
5,956,468 A 9/1999 Ancin
6,009,196 A 12/1999 Mahoney
(Continued)

OTHER PUBLICATIONS

Saund, et al., PixLabeler: User Interface for Pixel-Level Labeling of Elements in Document Images, Document Analysis and Recognition, 2009, pp. 646-650, ICDAR '09 10th Int'l Conf., Made Available Jul. 26, 2009.

(Continued)

*Primary Examiner* — Dennis G Bonshock
(74) *Attorney, Agent, or Firm* — Brundidge & Stanger, P.C.

(57) ABSTRACT

Methods and systems of the present embodiment provide segmenting of connected components of markings found in document images. Segmenting includes detecting aligned text. From this detected material an aligned text mask is generated and used in processing of the images. The processing includes breaking connected components in the document images into smaller pieces or fragments by detecting and segregating the connected components and fragments thereof likely to belong to aligned text.

23 Claims, 16 Drawing Sheets

(56) References Cited

U.S. PATENT DOCUMENTS

| | | | | |
|---|---|---|---|---|
| 6,301,386 | B1 | 10/2001 | Zhu et al. | |
| 6,377,710 | B1 | 4/2002 | Saund | |
| 6,411,733 | B1 | 6/2002 | Saund | |
| 6,587,583 | B1 | 7/2003 | Kurzweil et al. | |
| 6,771,816 | B1 | 8/2004 | Gaither | |
| 6,903,751 | B2 | 6/2005 | Saund et al. | |
| 7,010,165 | B2 * | 3/2006 | Hullender et al. | 382/186 |
| 7,036,077 | B2 | 4/2006 | Saund et al. | |
| 7,050,632 | B2 * | 5/2006 | Shilman | G06K 9/222 382/186 |
| 7,079,687 | B2 | 7/2006 | Fan | |
| 7,086,013 | B2 | 8/2006 | Saund et al. | |
| 7,136,082 | B2 * | 11/2006 | Saund et al. | 345/619 |
| 7,177,483 | B2 | 2/2007 | Saund | |
| 7,379,594 | B2 * | 5/2008 | Ferman et al. | 382/176 |
| 7,570,816 | B2 | 8/2009 | Bargeron et al. | |
| 7,734,094 | B2 | 6/2010 | Revow | |
| 7,783,117 | B2 | 8/2010 | Liu et al. | |
| 7,792,353 | B2 | 9/2010 | Forman et al. | |
| 7,899,258 | B2 | 3/2011 | Liu et al. | |
| 7,907,778 | B2 | 3/2011 | Xiao et al. | |
| 7,936,923 | B2 | 5/2011 | Liu et al. | |
| 7,958,068 | B2 | 6/2011 | Smith et al. | |
| 7,970,171 | B2 | 6/2011 | Lookingbill et al. | |
| 8,009,928 | B1 * | 8/2011 | Manmatha et al. | 382/283 |
| 8,156,115 | B1 * | 4/2012 | Erol | G06K 9/00442 382/181 |
| 8,171,392 | B2 | 5/2012 | Bastos dos Santos et al. | |
| 8,180,112 | B2 | 5/2012 | Kurtz et al. | |
| 2002/0106128 | A1 * | 8/2002 | Zlotnick | G06K 9/00449 382/224 |
| 2002/0135786 | A1 * | 9/2002 | Ma | G06K 9/6835 358/1.1 |
| 2003/0215136 | A1 * | 11/2003 | Chao | G06K 9/3283 382/176 |
| 2004/0165774 | A1 * | 8/2004 | Koubaroulis et al. | 382/179 |
| 2005/0100217 | A1 * | 5/2005 | Abdulkader | G06K 9/6835 382/186 |
| 2006/0002623 | A1 | 1/2006 | Dolan et al. | |
| 2006/0164682 | A1 * | 7/2006 | Lev | G06K 9/00442 358/1.15 |
| 2006/0193518 | A1 * | 8/2006 | Dong | 382/186 |
| 2006/0222239 | A1 | 10/2006 | Bargeron et al. | |
| 2007/0009153 | A1 | 1/2007 | Gallafent et al. | |
| 2008/0002887 | A1 | 1/2008 | Revow | |
| 2008/0175507 | A1 | 7/2008 | Lookingbill et al. | |
| 2008/0267497 | A1 | 10/2008 | Fan | |
| 2009/0185723 | A1 | 7/2009 | Kurtz et al. | |
| 2010/0040285 | A1 | 2/2010 | Csurka et al. | |
| 2011/0007366 | A1 | 1/2011 | Sarkar et al. | |
| 2011/0007964 | A1 | 1/2011 | Saund et al. | |
| 2011/0007970 | A1 | 1/2011 | Saund | |

OTHER PUBLICATIONS

Koyama et al., "Local-Spectrum-Based Distinction Between Handwritten and Machine-Printed Characters", in Proceedings of the 2008 IEEE Inl'l Coni. on Image Processing, San Diego, CA, Oct. 2008.

Evans et al., "Computer Assisted Interactive Recognition (CAVIAR) Technology", IEEE Inl'l Coni. Electro-Information Technology, 2005.

An et al.. "Iterated document content classification", in Inl'l Conf. Doc. Analysis & Recognition, val. 1, pp. 252-256, Los Alamitos, CA, 2007.

Houle et al., "Handwriting stroke extraction using a new xy1c transform", Proc. ICDAR, pp. 91-95, 2001.

Shetiy, et al., "Segmentation and labeling of documents using conditional random fields", Proc. SPIE, 6500, 2007.

Zotkins et al., "Gedi: Groundtruthing environment for document images", http://lampsrv01.umiacs.umd.edu/projdb/projecl.php?id-53.

Pal et al., "Machine-printed and handwritten text lines identification", Pall. Rec. Lett., 22(3-4):431, 2001.

Saund et al., PixLabeler: User Interface for Pixel-Level Labeliing of Elements in Document Images, Document Analysis and Recognition, 2009, pp. 646-650, ICDAR '09 10$^{th}$ Int'l Conf., Made Available Jul. 26, 2009.

Saund et al., PixLabeler: User Interface for Pixel-Level Labeling of Elements in Document Images, Documnt Analysis and Recognition, 2009, pp. 646-650, ICDAR '09 10$^{th}$ Int'l Conf., Made Available Jul. 26, 2009.

Kavallieratou et al., Handwritten text localization in skewed documents, ICIP, pp. 1102-1105, 2001.

Kavallieratou et al., "Machine-printed from handwritten text discrimination", IWFHR-9, pp. 312-316, 2004.

Kuhnke et al., "A system for machine-written and hand-written character distinction", ICDAR, pp. 811-814, 1995.

Li et al., A new algorithm for detecting text line in handwritten documents, IWFHR, pp. 35-40, 2006.

Manmatha et al., "A scale space approach for automatically segmenting words from historical handwritten documents", IEEE, TPAMI, 27(8):1212-1225, Aug. 2005.

Okun et al., "Automatic ground-truth generation for skew-tolerance evaluation of document layout analysis methods", ICPR, pp. 376-379, 2000.

Shafait et al., "Pixel-accurate representation and evaluation of page segmentation in document images", ICPR, pp. 872-875, 2006.

Shetty, et al., "Segmentation and labeling of documents using conditional random fields", Proc. SPIE, 6500, 2007.

Wenyin et al., "A protocol for performance evaluation of line detection algorithms", Machine Vision and Applications, 9:240-250, 1997.

Yacoub et al., "A ground truthing environment for complex documents", DAS, pp. 452-456, 2005.

Zi et al., "Document image ground truth generation from electronic text", ICPR, pp. 663,666, 2004.

Zotkins et al., "Gedi: Groundtruthing environment for document images", http://lampsrv01.umiacs.umd.edu/projdb/project.php?id-53.

Bal et al., "Interactive degraded document enhancement and ground truth generation", DAS, 2008.

Moll et al., "Truthing for pixel-accurate segmentation", DAS 2008, 2008.

Pal et al., "Machine-printed and handwritten text lines identification", Patt. Rec. Lett., 22(3-4):431, 2001.

Zheng et al., "Machine Printed Text and Handwriting Identification in Noisy Document Images", IEEE Trans. Pattern Anal. Mach. Intell., 26(3):337-353, 2004.

Chen et al., "Image Objects and Multi-Scale Features for Annotation Detection", in Proceedings of Int'l Conf. on Pattern Recognition, Tampa Bay, FL, 2008.

Breuel, "Segmentation of Handprinted Letter Strings Using a Dynamic Programming Algorithm", in Proceedings of 6th Int'l Conf. on Document Analysis and Recognition, pp. 821-826, 2001.

Freund et al., "A Decision-Theoretic Generalization of On-Line Learning and an Application to Boosting", in European Conf. on Computational Learning Theory, pp. 23-27, 1995.

Ha et al., "The Architecture of Trueviz: A Groundtruth/Metadata Editing and Visualizing Toolkit", Pattern Recognition, 36(3):811-825, 2003.

Yang et al., "Semi-Automatic Groundtruth Generation for Chart Image Recognition", DAS, pp. 324-335, 2006.

Saund et al., "Perceptually-Supported Image Editing of Text and Graphics", ACM UISTI, pp. 183-192, 2003.

Huang et al., "User-Assisted Ink-Bleed Correction for Handwritten Documents", Joint Conference on Digital Libraries, 2008.

OpenCV, Internet website http://opencv.willowgarage.com/wiki/, last edited Mar. 18, 2009.

Evans et al., "Computer Assisted Interactive Recognition (CAVIAR) Technology", IEEE Int'l Conf. Electro-Information Technology, 2005.

Roth et al., "Ground Truth Editor and Document Interface", Summit on Arabic and Chinese Handwriting, 2006.

(56) References Cited

OTHER PUBLICATIONS

An et al., "Iterated document content classification", in Int'l Conf. Doc. Analysis & Recognition, vol. 1, pp. 252-256, Los Alamitos, CA, 2007.
Fan, et al., "Classification of machine-printed and handwritten texts using character block layout variance.", Pattern Recognition, 31(9):1275-1284, 1998.
Liang, et al., "Document image restoration using binary morphological filters", in Proc. SPIE Conf. Document Recognition, pp. 274-285, 1996.
Ford, et al., "Ground truth data for document image analysis", Symposium on Document Image Understanding and Technology, 2003.
Gatos et al., "ICDAR2007 handwriting segmentation contest", ICDAR, pp. 1284-1288, 2007.
Guo et al., "Separating handwritten material from machine printed text using hidden Markov models", Proc. ICDAR, pp. 439-443, 2001.
Guyon et al., "Data sets for OCR and document image understanding research", Proc. SPIE—Document Recognition IV, 1997.
Houle et al., "Handwriting stroke extraction using a new xytc transform", Proc. ICDAR, pp. 91-95, 2001.

* cited by examiner

SYSTEM AND METHOD FOR SEGMENTING TEXT LINES IN DOCUMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

INCORPORATION BY REFERENCE

This application claims the priority, as a divisional, of U.S. application Ser. No. 12/500,882, filed Jul. 10, 2009 (now U.S. Application Publication No. US-2011-0007970-A1, published Jan. 13, 2011), the disclosure of which is incorporated herein by reference in its entirety.

CROSS REFERENCE TO RELATED PATENTS AND APPLICATIONS

Commonly assigned applications, U.S. Application Publication No. US-2011-0007366-A1, published Jan. 13, 2011, to Saund et al., entitled, "System And Method For Classifying Connected Groups Of Foreground Pixels In Scanned Document Images According To The Type Of Marking"; and U.S. Application Publication No. US-2011-0007964-A1, published Jan. 13, 2011, to Saund et al., entitled, "System and Method for Machine-Assisted Human Labeling of Pixels in an Image", are each incorporated herein by reference in their entirety.

BACKGROUND

The present exemplary embodiments relate to systems and methods for segmenting text lines in documents, and the use of the segmented text in the determination of marking types in documents.

An automated electronic based system having the capability for such detection has uses in a number of environments. For example, in legal document discovery it is valuable for lawyers to be able to quickly narrow down, from millions of pages, those pages which have been marked on. Also, in automated data extraction, absence of handwritten marks in a signature box can be translated to mean the absence of a signature. Further, being able to tell noise marks apart from machine printed marks can lead to better segmentation for optical character recognition (OCR). It is therefore envisioned one area the present system will find use is in the context of forms, where printed or handwritten text may overlap machine printed rules and lines.

Identifying granular noise (sometimes called salt and pepper noise), line graphics, and machine print text have received the most attention in document image analysis literature. The dominant approaches have relied on certain predictable characteristics of each of these kinds of markings. For example, connected components of pixels that are smaller than a certain size are assumed to be noise; large regions of dark pixels are assumed to be shadows; and long straight runs of pixels are assumed to come from line graphics. Identification of machine print text is an even more difficult task. In commercial OCR packages, systems for the detection of machine printed regions have been heavily hand-tuned, especially for Romanic scripts, in order to work in known contexts of language, script, image resolution and text size. While these processes have had certain success when used with clean images, they have not been successful when dealing with images having clutter.

Zheng et al., "Machine Printed Text And Handwriting Identification In Noisy Document Images," IEEE Trans. Pattern anal. Mach. Intell., 26(3):337-353, 2004, emphasized classifying regions of pixels (roughly text words) into one of the following categories: machine print text, handwritten text, noise. Zheng et al. employed a large number of features, selected according to discriminative ability for classification. The results are post processed using a Markov Random Field that enforces neighborhood relationships of text words.

Chen et al., "Image Objects And Multi-Scale Features For Annotation Detection", in Proceedings of International Conference on Pattern Recognition, Tampa Bay, Fla., 2008, focused on the selecting the right level of segmentation through a multiscale hierarchical segmentation scheme.

Koyama et al., "Local-Spectrum-Based Distinction Between Handwritten And Machine-Printed Characters", in Proceedings of the 2008 IEEE International Conference On Image Processing, San Diego, Calif., October 2008, used local texture features to classify small regions of an image into machine-printed or handwritten.

FIG. 1 shows a portion of a document 100 containing machine graphics 102, machine printed text 104, and handwriting 106. Various applications require separating and labeling these and other different kinds of markings.

A common intermediate step in the art is to form connected components. A problem arises when connected components contain mixed types of markings, especially when machine printed and handwritten text touch graphics, such as rule lines, or touch handwritten annotations that are not part of a given text line. Then, correct parsing requires breaking connected components into smaller fragments. One example is a signature that sprawls across the printed text of a form or letter. Another example is seen in FIG. 1 where the handwritten numbers 106 extend over the machine printed text 102.

FIG. 2 shows connected components (e.g., a sampling identified as 108a-108n) of FIG. 1 in terms of bounding boxes (e.g., a sampling identified as 110a-110n). Clearly many of these connected components can and do include mixtures of marking types. The problem is to break these into smaller meaningful units suitable for grouping and classifying into smaller meaningful units suitable for grouping and classifying into correct types.

One method for breaking connected components into smaller fragments is recursive splitting is discussed on commonly assigned U.S. Patent Publication No. US-2011-0007366-A1, published Jan. 13, 2011, to Saund et al., entitled, "System And Method For Classifying Connected Groups Of Foreground Pixels In Scanned Document Images According To The Type Of Marking".

Another approach is described by Thomas Breuel in "Segmentation Of Handprinted Letter Strings Using A Dynamic Programming Algorithm", in Proceedings of Sixth International Conference on Document Analysis and Recognition, pages 821-6, 2001.

Still another concept for breaking connected components into smaller fragments is disclosed in U.S. Pat. No. 6,411,733, Saund, "Method and apparatus for separating document image object types." This applies mainly to separating pictures and large objects from text from line art. It does not focus on separating small text from small line art or graphics.

SUMMARY

Methods and systems of the present embodiment provide segmenting of connected components of markings found in document images. Segmenting includes detecting aligned text. From this detected material an aligned text mask is generated and used in processing of the images. The processing includes breaking connected components in the document images into smaller pieces or fragments by detecting and segregating the connected components and fragments thereof likely to belong to aligned text.

DETAILED DESCRIPTION

Figure 1:
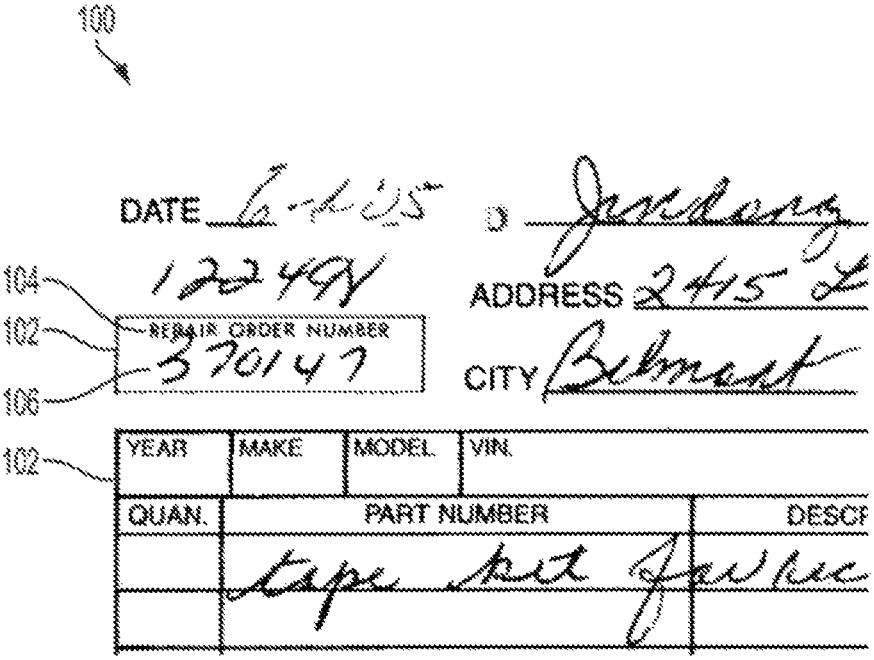
FIG. 1 is an example image region with mixed machine print text, handwritten text and graphics.
Figure 2:
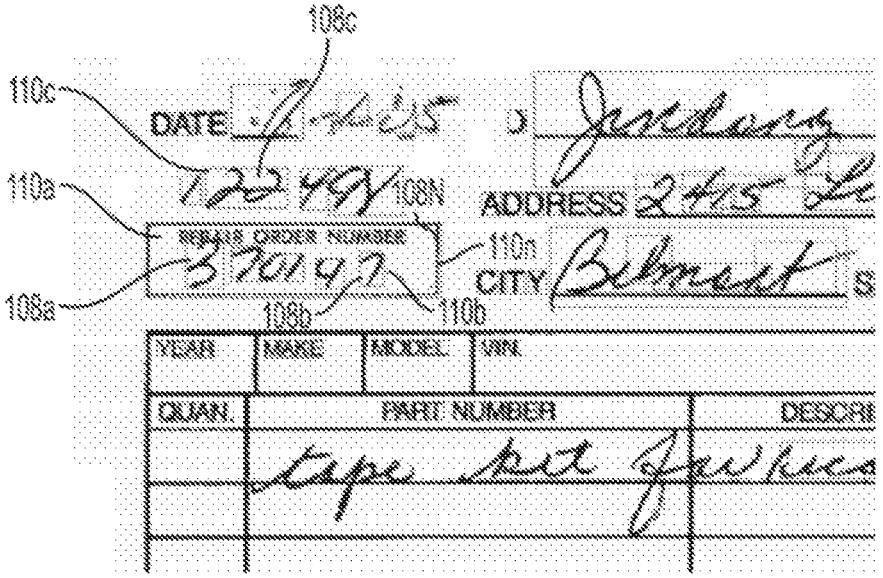
FIG. 2 is the image of FIG. 1 with connected components shown by their boundary boxes.

Described are methods and systems for finding alignments that come from machine-printed text lines in documents to segment the text lines, for use in larger methods and systems designed to identify various kinds of markings in scanned binary documents. The identification is then used to detect handwriting, machine print and noise in the document images. The methods and systems of the present disclosure are trainable based on examples. In some embodiments the systems are configured to input and transform a physical hardcopy document into a binary image and to output a new image version where image pixels are color coded according to the automatic classification of the type of marking the fragment belongs.

In one embodiment a hardcopy document is digitized with images, including at least one of handwritten text, machine printed text, machine printed graphics, unidentified markings (i.e., noise) and form lines or rules. The images are segmented into fragments by a segmenter module. Each fragment is classified by an automatically trained multi-stage classifier and classification labels are provided to the fragments. These labels may be colors, differing gray tones, symbols, or other identifiers. In order to arrive at the classification label, the classifier considers not just properties of the fragment itself, but also properties of the fragment neighborhood. In classification nomenclature these properties or attributes are called features. Features relevant for discrimination are picked out automatically from among a plurality of feature measurements. The classifier is a two-staged classifier trained from labeled example images where each pixel has a "groundtruth" label, i.e., the label on a base or original image. A held out set of groundtruth images can be used for evaluation. Thereafter, the labeled document is stored in memory, displayed in an electronic display, printed out or otherwise processed.

A particular aspect of the present methods and systems is the ability to automatically train parameters from examples or groundtruths. This enables the present concepts to be used in high-volume operations by targeting specific goals and data at hand.

The disclosed methods and systems address the comparatively difficult task of classifying small marking fragments at the connected component or sub-connected component level. The motivation is for at least two reasons. First this allows for calling out/identifying touching markings of different types, which permits appropriate splitting, when necessary, of the connected components. The second motivation is to build a useful basic building block (e.g., a fragment-classifier) with the understanding that coarser level decisions (at the level of words, regions, or pages) can be made with much higher accuracy by aggregating the output of the described basic building block tool (e.g., the fragment-classifier). In contradistinction, previous concepts target classification of larger aggregate regions only.

It is understood a single foreground (e.g., black) pixel alone does not have sufficient information to be used to decipher its source type (i.e., the type of mark it is). Following are examples of different types of marking on an image. It is to be understood the markings described below are provided to assist in the explanation of the present concepts and are not considered to be limiting of the present description or the claims of this application. Thus, the following assumptions are examples made to assist in providing a representation of groundtruth, and a consistent evaluation metric:

i. Pixel labels: Each pixel has a single marking category label. This assumption is purely pragmatic, of course. This allows the groundtruth of an image to be represented as another image with an integer label for each pixel. Thus a groundtruth can be stored and its output processed using known image formats, and image viewers, loaders, and editors may be used to efficiently visualize and manipulate them. This also leads to a simple, general, and consistent evaluation metric that is discussed later.

ii. Background pixels: marking categories are assigned only to foreground pixels (e.g., black) and it is assumed that white pixels form the background (e.g., paper). This assumption matches current usage scenarios.

iii. Ambiguous pixels: Clearly, multiple markings can overlap in a single black pixel. When both markings are of the same category, there is no ambiguity in pixel labeling. In other situations the pixel has to be assigned to one of the overlapping marking categories. A predefined order of priority will be assumed for the category labels. Any ambiguity can be resolved by assigning the label with higher priority. For example, in one implementation, "Handwritten Text" is the category with highest priority. When handwritten characters overlap machine printed lines, pixels in the intersection are labeled as "Handwritten Text". Noise labels have the lowest priority.

iv. Evaluation metrics: When comparing two groundtruth label files, or an automatic classification output to groundtruth, the labels are compared at each pixel location and one error will be counted if the two labels differ. This is useful as an evaluation metric because the definition works consistently irrespective of the solution approach. In one embodiment of this application, a segment-then-classify approach is used. An alternate approach classifies each pixel based on surrounding context. Yet another approach assigns labels to grid-patches of the image. Nevertheless, for all approaches, the present methods and systems measures the fraction of foreground pixels correctly labeled. The described concepts classify (and learn to classify) fragments, not pixels. Nevertheless, it is useful to use the pixel error metric as wrongly classifying a large fragment is worse than making a mistake on a small fragment.

v. Assumptions about image content: While the setup is quite general, and the present systems and methods apply to situations not in line with the foregoing, there are several assumptions that are made about the images that are used—either explicitly or implicitly. First, it is assumed the test/application scenarios are well represented in the training images. For example, an assumption is made the images represent everyday scanned document images, nearly upright, in binary, at roughly 300 dpi; and that machine printed text is horizontally laid out.

In implementations, such as a software program operated on a document editing device, the above assumptions are considered to hold. Nevertheless, it is considered the systems and methods of the present application will continue to work if they do not hold.

The present methods and systems have been designed to be fairly general and extensible, therefore the following target marking categories as defined below may be altered depending upon the particular implementation. However, for the present discussion the identification of the following target markings and their order of disambiguation priority (higher (i) to lower (v) are used:

i. Handwritten: This consists of HandwrittenText (handwritten paragraphs, words, single letters, or even just punctuation marks), HandwrittenSignatures, and HandwrittenGraphics (underlines, arrows, line markings, strikethroughs, check marks in check boxes). This text may be handprinted or cursive, and in any language or script. Cursive font printed text is considered MachinePrintText.

ii. MachinePrintText: Black on white text that is machine printed in any language or script. Shaded text, or black background for white text should be marked as MachinePrintGraphic.

iii. MachinePrintGraphic: MachinePrintLineGraphic (underlines, arrows, background rules, lineart), or MachinePrintBlockGraphic (bullets, logos, photos).

iv. ScannerNoiseSaltPepper: Small granular noise usually due to paper texture, or faulty binarization.

v. ScannerNoiseDarkRegion: This is meant to cover significant black regions not generated by machine or handwriting ink. This includes black pixels generated by darkening of background-material, e.g. paper folds, shadows, holes, etc.

1. Solution Architecture

Figure 3:
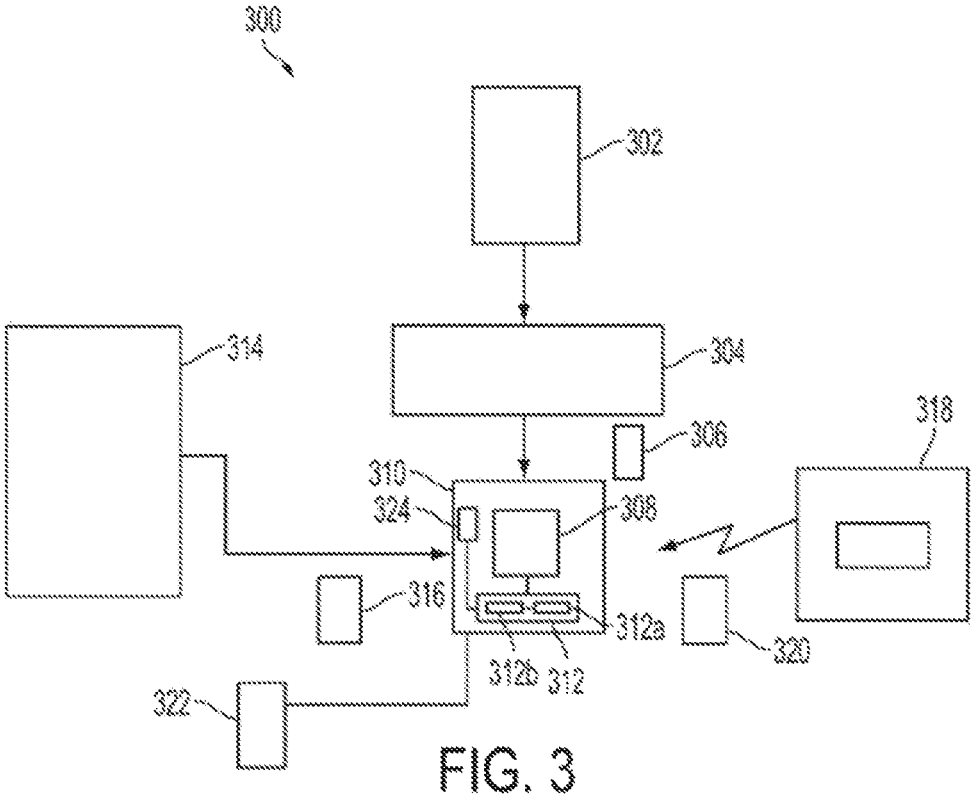
FIG. 3 is a system diagram of an environment in which the concepts of the present application are implemented.

Depicted in FIG. 3 is a system 300 in which the concepts of the present application may be implemented. System 300 illustrates various channels by which digitized bitmapped images and/or images formed by digital ink techniques are provided to segmenter-classifier systems of the present application.

More particularly, a hardcopy of a document carrying images 302 is input to a scanner 304 which converts or transforms the images of document 302 into an electronic document of the images 306. While not being limited thereto, the images on hardcopy document 302 may be created by electronic data processing devices, by pens, pencils, or other non-electronic materials, or by stamps both electronic and manual. The electronic document 306 is displayed on a screen 308 of a computer, personal digital system or other electronic device 310, which includes a segmenter-classifier system 312 of the present application. The electronic device 308 includes at least one processor and sufficient electronic memory storage to operate the segmenter-classifier system 312, which in one embodiment may be software. It is understood the electronic device 310 includes input/output devices including but not limited to a mouse and/or keyboard.

Alternatively, a whiteboard or digital ink device 314 may be coupled to electronic device 310, whereby bitmapped or digital ink images 316 are electronically transmitted to device 310. Another channel by which bitmapped or digital ink images may be provided to the segmenter-classifier system 312, is through use of another electronic device 318. This device can be any of a number of systems, including but not limited to a computer, a computerized CAD system, an electronic tablet, personal digital assistant (PDA), a server on the Internet which delivers web pages, or any other system which provides bitmapped and/or digital ink images 320 to segmenter-classifier system 312. Further, image generation software, loaded on electronic device 310, can be used to generate a bitmapped or digital ink image for use by segmenter-classifier system 312. A finalized version of the electronic document with images processed by the segmenter-classifier system 312 is stored in the memory storage of the computer system 310, sent to another electronic device 318, printed out in hardcopy form by a printer 322 or printed out from printing capabilities associated with converter/scanner 308.

It is to be appreciated that while the foregoing discussion explicitly states a variety of channels to generate the images, concepts of the present application will also work with images on documents obtained through other channels as well.

With continuing attention to FIG. 3 segmenter-classifier system 312, includes segmenter 312a and classifier 312b. The segmenter 312a takes in a document image and partitions the set of pixels into small fragments. The classifier 312b then takes each fragment and assigns a category label to that fragment. The classifier 312b returns scores corresponding to different categories of markings, and in one embodiment the category with the best score. A downstream application such as an interpreter 324 may further interpret the scores in order to make decisions. For example, scores not satisfying an acceptance criteria may be labeled as "reject" or "unknown", or fragments that have handwriting scores above a preset threshold may be highlighted or marked for annotation processing on a processed electronic document displayed on display 308.

2. Segmenter

In the present application classifying or scoring each individual pixel according to its type of marking, particularly when pixels are either black or white, is accomplished by considering spatial neighborhoods and other forms of context of the document. Pixels may be classified based on feature measurements made on the neighborhood. This can lead to interesting possibilities especially enabling formulations where segmentation and recognition proceed in lockstep informing each other.

An approach of the present application is to fragment the images into chunks of pixels that can be assumed to come from the same source of markings. These fragments are then classified as a whole. Needless to say that since this segmenter 312a of the segmenter-classifier 312 will make hard decisions, any errors made by the segmenter are likely to cause errors in the end-result. Two kinds of errors are counted: (a) Creating fragments that are clearly a combination of different marking types, and (b) Unnecessarily carving out fragments from regions that are the same marking type.

While it is clear that errors of type (a) are bound to result in pixel-level labeling errors, the effect of type (b) errors are more subtle. Thus it is considered the more surrounding context that can be gathered, the better the results. It has been determined herein that identifying handwritten regions from machine printed regions is easier, than it is to tell handwritten characters from machine printed characters. It becomes even more difficult at the stroke level. Further problems arise when artificial boundaries introduced by the segmenter 312a mask the true appearance of a marking.

Despite the above concerns, a "segment-then-classify" approach has been adopted. The present approach acts to over-segment rather than under-segment by relying on connected component analysis, but with decision processing to split selected connected components when necessary.

Figure 4:
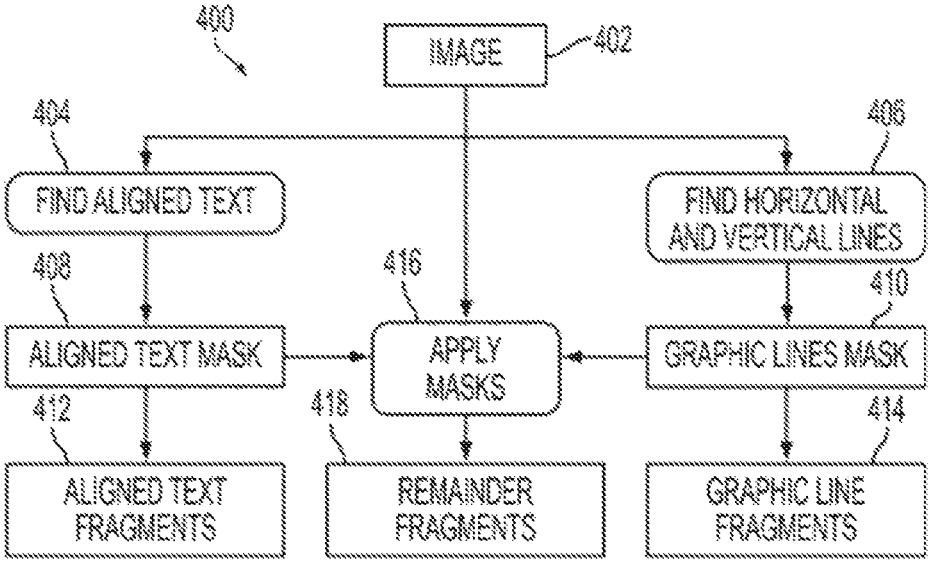
FIG. 4 illustrates a high level process flow for generating masks and using the masks to break connected components into smaller pieces.

Turning to FIG. 4, illustrated is a process 400 by which the operations of the segmenter take place to accomplish segmenting of the image. In this embodiment, the concept of finding alignments that come from, for example, machine-printed text is illustrated in operation with the finding of horizontal and vertical lines, as well as the use of a combined mark to find other fragments. It is, however, to be understood while the following discusses these concepts together, the finding of aligned text may be used without other detection concepts. In operation, an electronic image 402 is investigated to identify aligned text 404 and at the same time separately identify horizontal and vertical lines of the image 406. Once the aligned text is identified this information is used as an aligned text mask 408. Similarly, the identified horizontal and vertical lines are used as a graphic lines mask 410. The aligned text mask 408 and the graphic lines mask 410 govern how the process breaks the image into pieces corresponding to aligned text fragments 412 and pieces corresponding to graphic line fragments 414. Also in process 400, the aligned text mask 408 and graphic lines mask 410 are combined and applied to the image 416 and this combination governs how the process breaks the image into pieces corresponding to reminder fragments of the image 418, where in one embodiment remainder fragments are pieces of the image that fall outside the bounds of lines of machine printed or neatly written text.

Figure 5:
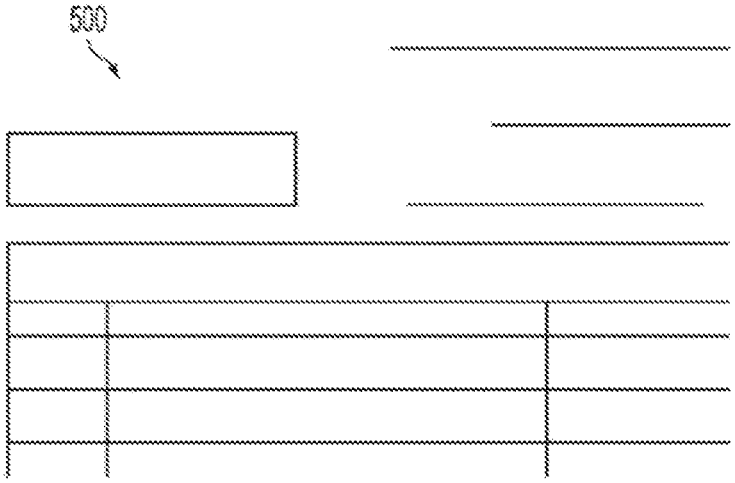
FIG. 5 shows the results of the mask processing on an image returning horizontal and vertical line markings of the image.

As an example of the obtained masks, attention is directed to FIG. 5 which shows the graphic lines mask 500 of the image of FIG. 1, containing only horizontal and vertical line graphics. It is understood the processes including the aligned text mask and the combined mask will similarly have only those portions of the image corresponding to the mask contents.

Figure 8:
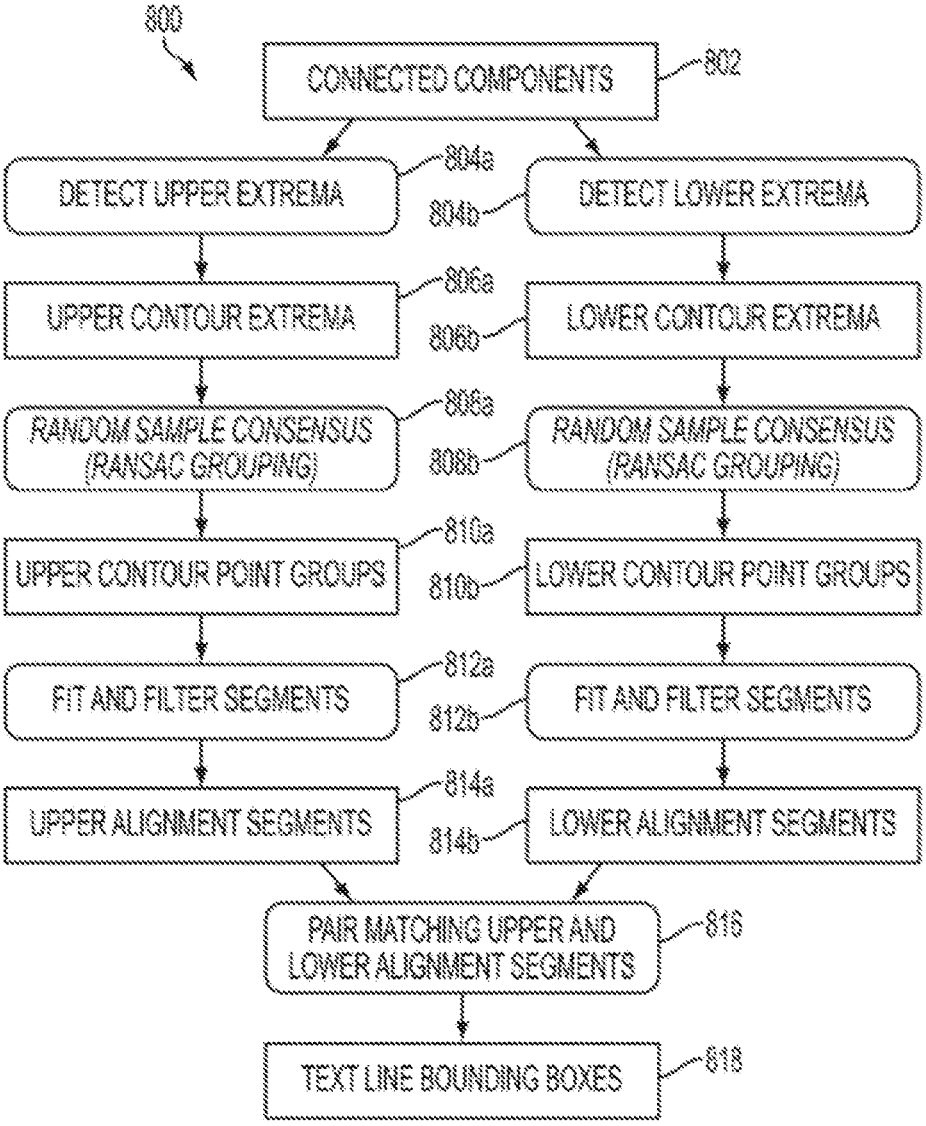
FIG. 8 depicts a flow diagram for the processing steps used to find text lines.

As will be discussed in more detail below, fragments generated by process 400 are used in further operations designed to classify markings on a document image. However, it is mentioned here that another aspect of the operations of FIG. 4 (whose operations are expanded on by the processes of FIGS. 8 and 15) is that it produces features that are useful in and of itself for classifying fragments. Specifically, the alignment processes disclosed herein, is able to find fragments that align to a high degree or "very well" and may themselves be determined more likely to be machine printed markings, while fragments that determined by the processes found to align only "moderately well" are more likely to come from handwritten text. It is to be understood that when stated that text aligns to a "high degree", "very well" or only "moderately well", such terms correspond to threshold values which are determined for particular implementations. More specifically, in some implementations, the degree to which alignment must be found may be higher or lower, depending on the uses of the present concepts. The thresholding values can therefore be built into the system based on those particular requirements and the system may in fact be tunable for these factors while in operation.

It is noted various known processes maybe used to detect aligned text, and horizontal and vertical graphics. A particular process of the present application for determining aligned text will be discussed in connection with FIG. 8.

Figure 6:
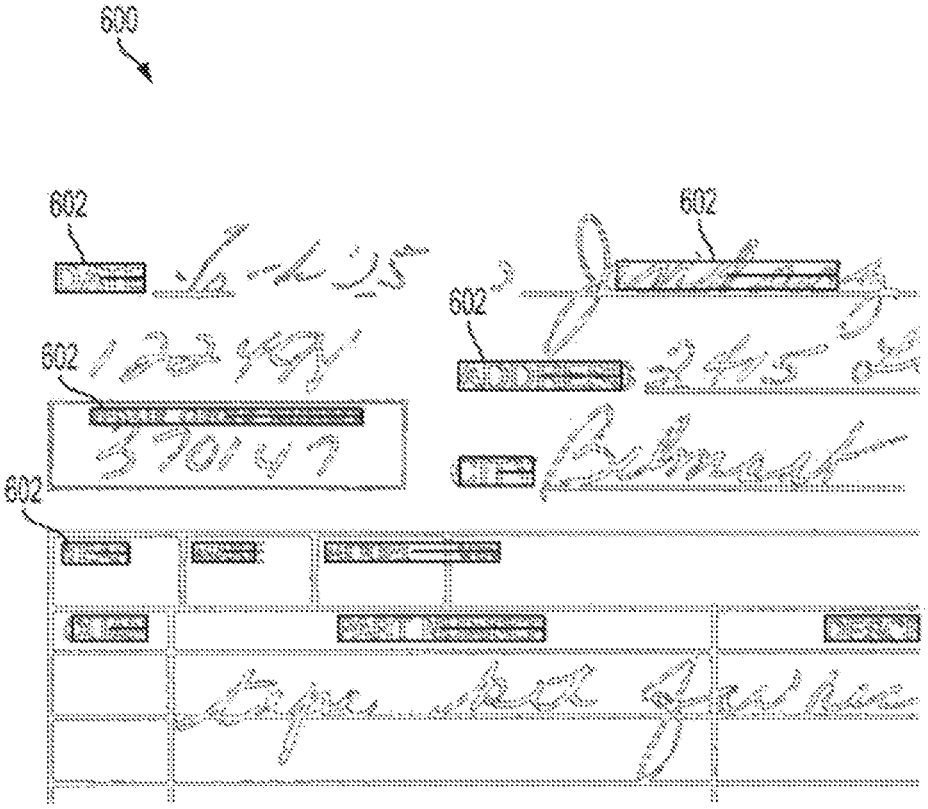
FIG. 6 depicts bounding boxes of lines of text found by the process of the present application.

Turning to FIG. 6, shown is an image 600 generated by process 400, where bounding boxes 602 surround aligned text. These bounding boxes 602 (not all bounding boxes are numbered) define aligned text and identify connected components that extend outside of aligned text regions.

Figure 7:
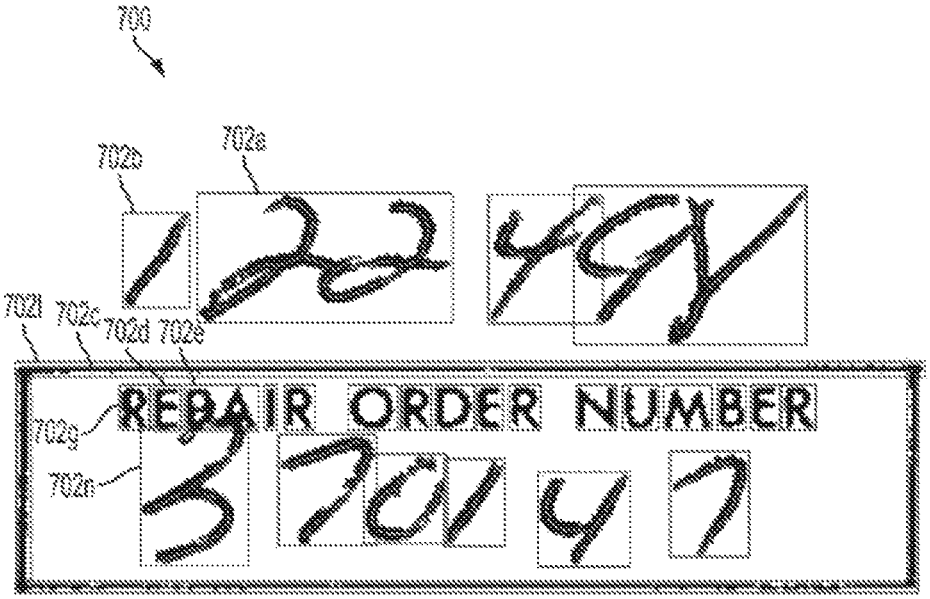
FIG. 7 is a portion of FIG. 6 with bounding boxes around fragments after splitting by the process of the present application.

Turning now to FIG. 7 illustrated is a close-up of one portion 700 of the image of FIG. 6. Exemplary bounding boxes 702a-702n are identified which enclose fragments found by process 400. All the bounding boxes are not numerically identified simply for clarity purposes. Of particular note in figure portion 700 is the situation where handwritten numbers cross the machine printed text, i.e., "3" crosses at the "PA" of "REPAIR ORDER NUMBER". In this instance attention is directed to the connected component comprising "3" touching the word REPAIR" which is broken into smaller pieces, with some inside the aligned text region the "PA" fragment.

A particular aspect of the present application disclosure is the processes used to find lines of aligned text such as highly aligned text—e.g., "REPAIR ORDER NUMBER" and pretty good aligned text—e.g., "370147" (handwritten in FIG. 7). Identifying this material is based on grouping of extrema of contour paths, which may be achieved in accordance with process 800 of FIG. 8.

Figure 9:
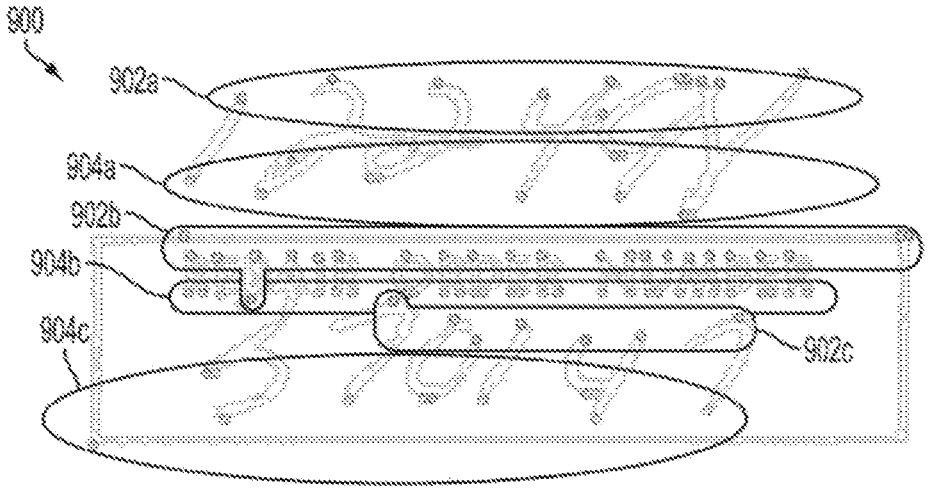
FIG. 9 depicts a portion of FIG. 6 illustrating the upper and lower extrema of the bounding contours of connected components.

Initially, connected components (CC) 802 are provided. Upper extrema and lower extrema 804a, 804b are detected. The results of this process are shown in FIG. 9 which identifies contours from the sample image segment in 900, with upper contour extrema identified by points 902a, 902b, 902c and lower contour extrema identified by points 904a, 904b, 904c.

Figure 10:
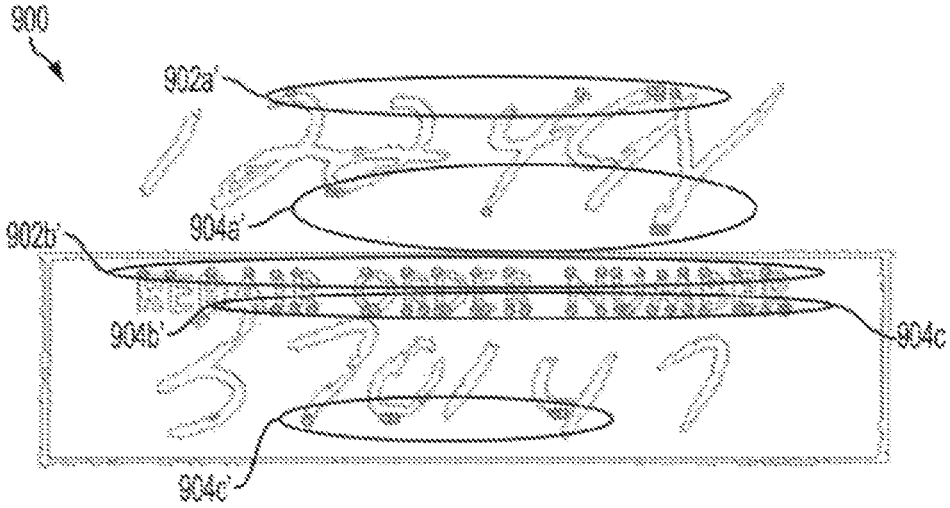
FIG. 10 illustrates content extrema points grouped according to horizontal alignment.

Returning to FIG. 8, upper and lower contour extrema are processed independently to find groups of the points (806a, 806b). This is accomplished where first horizontal strips of extrema points are found by clustering by vertical position and selecting points that are within a threshold instance of a selected maximum. The described process is done iteratively as points are grouped and removed from the pool of points identified in steps 804a and 804b. Each such strip of points, are segregated according to any large horizontal gaps. Finally, extrema points are clustered into horizontal or nearly horizontal groups of extrema points that align with each other, using in one embodiment the well-known RANSAC (i.e., abbreviation for Random Sample Consensus) algorithm (808a, 808b). FIG. 10 shows extrema groups of points (902a', 904a', 902b', 904b' and 904c') found by this operation. As is seen when comparing FIG. 9 to FIG. 10, the RANSAC operation removes points determined to be outliers, where in fact all upper extrema points 902c are removed, along with a number of points within the remaining groups.

Figure 11:
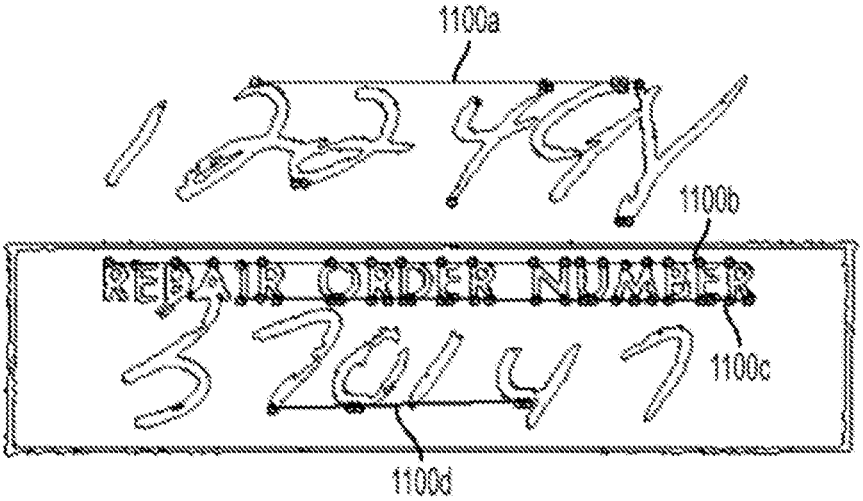
FIG. 11 shows line segments formed by extrema point groups.
Figure 12A:
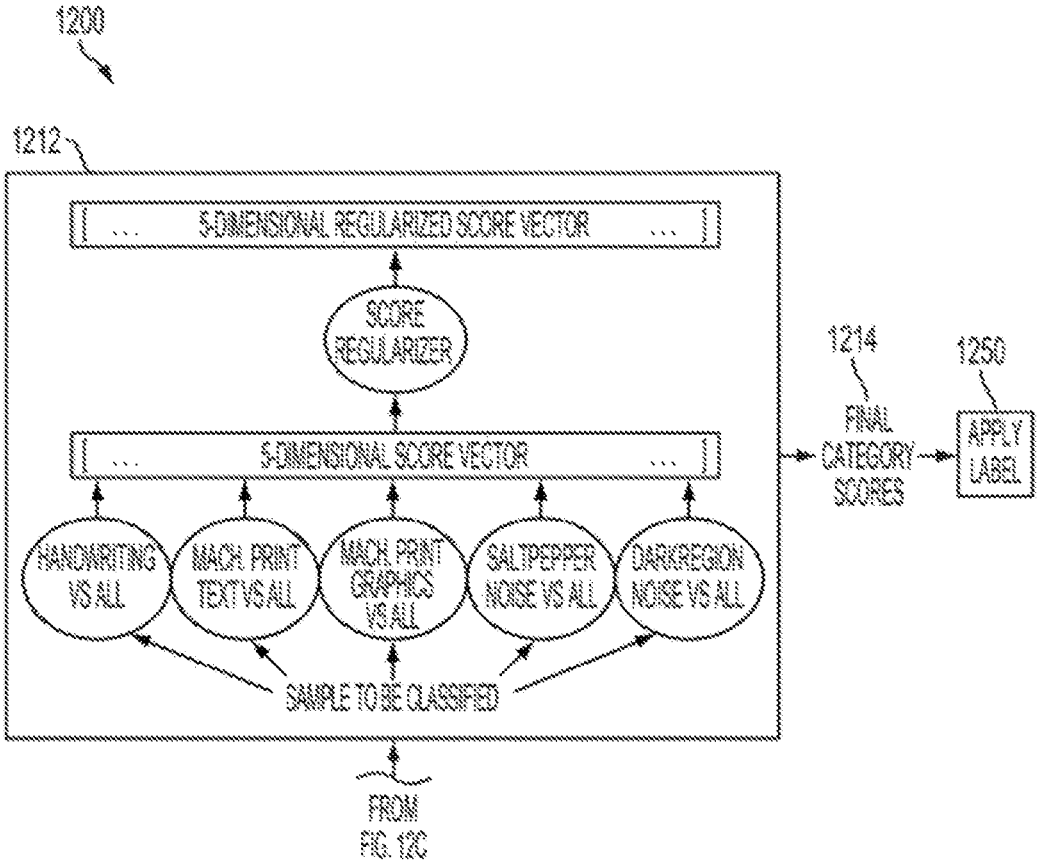
FIG. 12A is an outline of a portion of a two-stage classifier configured in accordance with the present application.
Figure 12B:
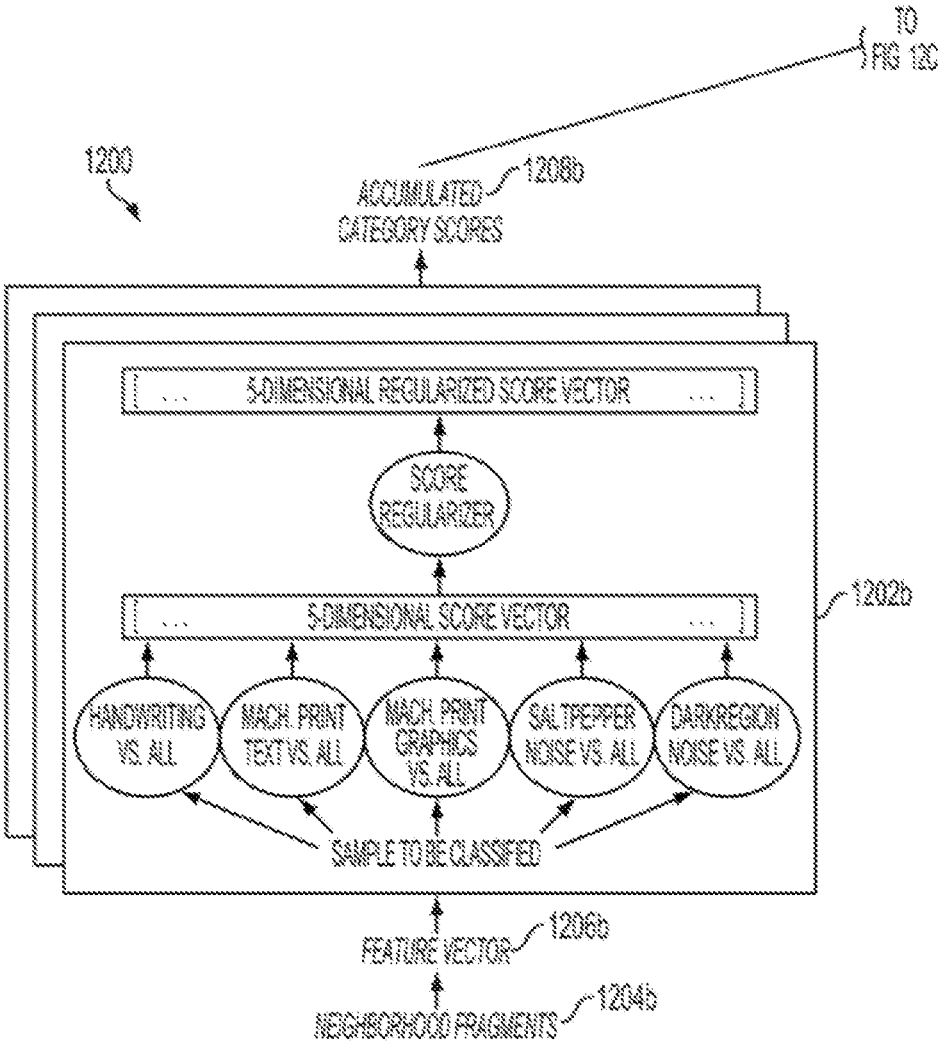
FIG. 12B is an outline of a portion two-stage classifier configured in accordance with the present application.
Figure 12C:
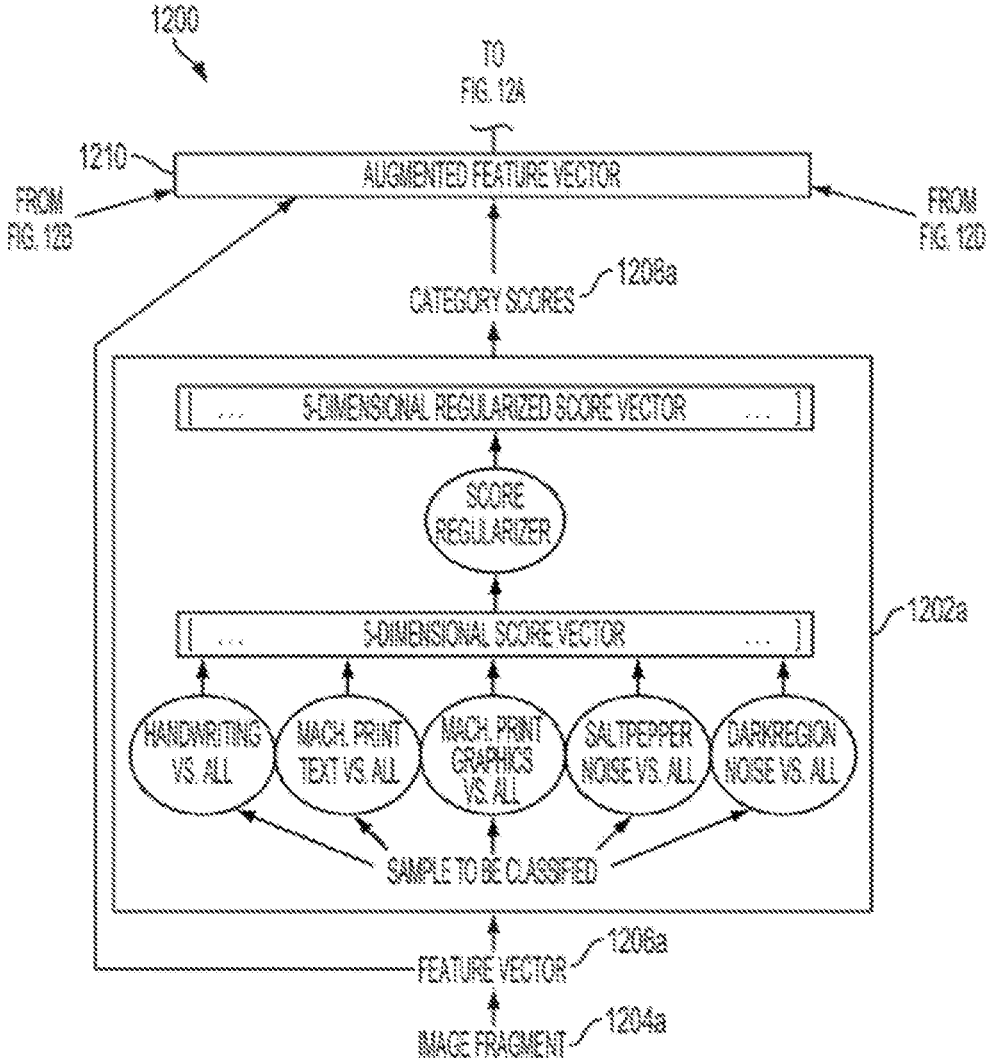
FIG. 12C is an outline of a portion two-stage classifier configured in accordance with the present application.
Figure 12D:
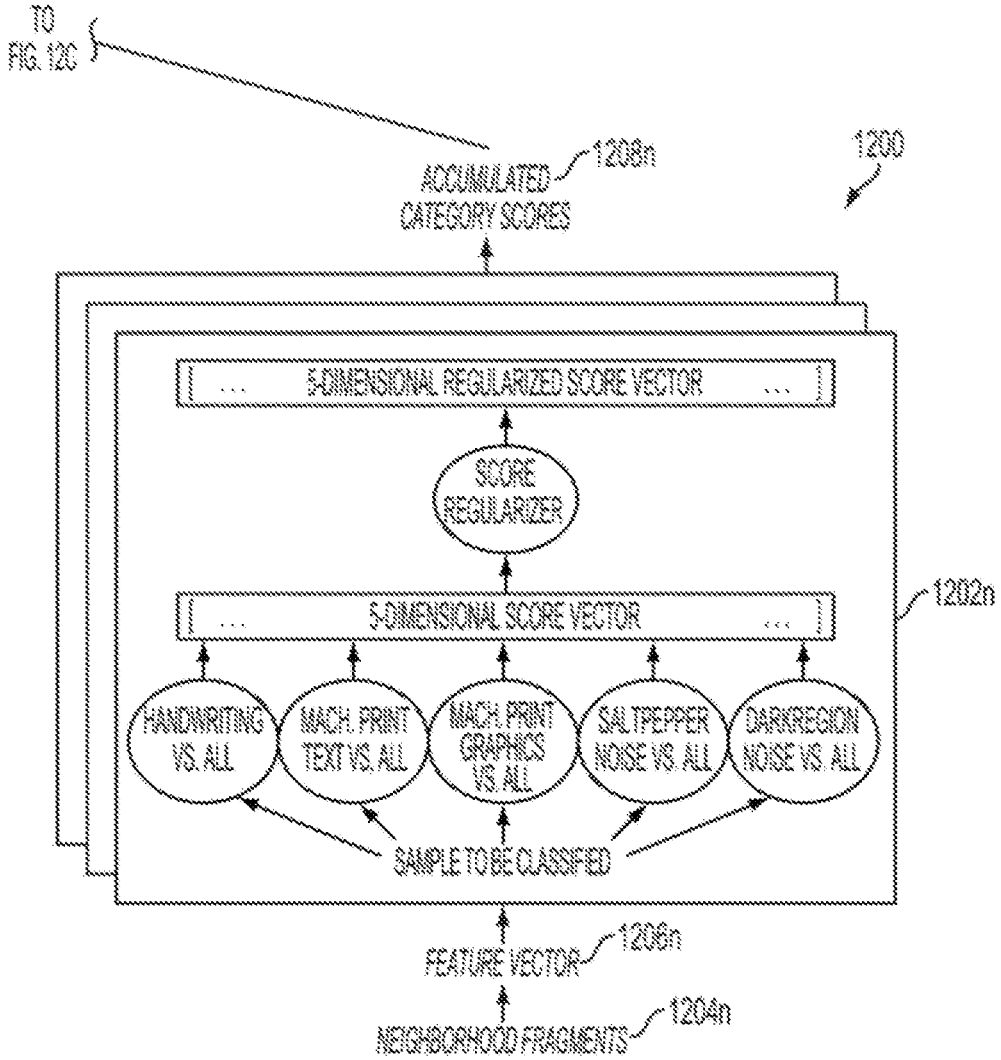
FIG. 12D is an outline of a portion two-stage classifier configured in accordance with the present application

Returning to FIG. 8, in steps 812a and 812b, line segments are fit to the point groups (e.g., in FIG. 11 lines 1100a and 1100b at the top of "12249Y", lines 1100b and 1100c at the top and bottom of "REPAIR ORDER NUMBER" and line 1100d at the bottom of "370147"). Line segments with an orientation falling outside a predetermined threshold difference from horizontal are removed (e.g., line segments 1100b and 1100c are maintained and line segments 1100a and 1100d are removed as will be shown below).

Thereafter, in steps 814a and 814b, pairs of line segments derived from upper and lower contour extrema points are paired according to overlap and distance. These form text line boxes step 818, as previously shown in FIG. 6. It is noted final text bounding boxes are expanded by the extent of ascender and descenders and the left and right extent of connected components that contributed extrema points, so in some cases the text line bounding boxes will be somewhat larger than this example produces.

3. Fragment Classifier

As discussed above, segmenter 312a generates, from an image, a list of fragments. Each fragment is characterized by a number of feature measurements that are computed on the fragment and surrounding context. The classifier of the present application is trained to classify each fragment into one of the categories of the described marking types, on the basis of these features.

3.1 Features

Various kinds of features, in addition to the described text line feature, are measured on each fragment, a sampling of these other features include:

i. Segmenter features: These are simply two features that are either zero or one, indicating whether the fragment was part of horizontal lines and vertical lines images respectively.

ii. Size features: These include width, height, aspect ratio of the bounding boxes, the size of the perimeter, the number of holes in the connected component, the number of foreground pixels. Also included are the number of spine-fragments resulting from midcrack thinning, the ratio of foreground count to bounding box area, the ratio of foreground count to the perimeter size, and perimeter size to the bounding box area.

iii. Location features: The minimum horizontal and vertical distances of the fragment from the image boundary are measured. The idea is that this can help to tell shadow noise from dark graphic regions in the document.

iv. Regularity features: This is mainly targeted at characterizing machine printed text apart from other kinds of markings. Printed text shows a high degree of regularity of alignment and of size. If many other fragments in the document or within a spatial neighborhood share the same height, bounding box top y, and bounding box bottom y, it indicates that the current fragment is likely to be printed text or graphics. It is more accidental for handwriting or noise to show such regularity. The feature measurements are made as histograms of relative differences. For example, for the measuring height regularity, histograms of (hi-h0) are designed, where hi is the height of the $i^{th}$ fragment and h0 is the height of this fragment. The histogram bins are set to [−32, −16), . . . , [−4, −2), [−2, −1), [−1, 0), [0, 0], (0, 1], (1, 2], (2, 4], (16, 32].

Thus it would be expected the three middle bins would have high counts for printed text. The height histograms consider all fragments in the image, while the bounding box extremity histograms only consider fragments in an x-neighborhood.

v. Edge Curvature features: For each fragment this attempts to characterize the curvature of the outer contour through quick measurements. The curvature index at a contour point is measured as the Euclidean distance of that point from the straight line joining two other contour points that are a fixed contour distance (16 contour points) away from this point. The histogram of all curvature indices measured over a fragment's outer contour is computed and used.

vi. Contour features: This consists of two measurements. Traversing counter-clockwise around the outer contour of a fragment, the histogram of the displacement between two contour points separated by four contour positions is recorded. From here the histogram of unsigned edge displacements (where two opposite displacements get added), and histogram of symmetry violations (where two opposite displacements cancel each other) are then measured. The expectation is to see higher histogram strength around vertical and horizontal directions for printed lines and printed text. For uniform strokes it is expected low values for symmetry violations will be seen.

vii. Run length features: Spines of fragments are computed by a mid-crack thinning algorithm, such as disclosed in U.S. Pat. No. 6,377,710, to Saund, entitled, "Method And Apparatus For Extracting The Skeleton Of A Binary Figure By Contour-Based Erosion", 2002, incorporated herein in its entirety. At each point on the spine the minimum and maximum of the horizontal and vertical run-lengths are recorded. The histograms of these two numbers are returned as run-length features. Printed parts are expected to have more concentrated run-length histograms than handwriting or noise. But the concentration need not be uni-modal. The raw-run length histograms as features are used, assuming that the classifier trainer will be able to pick out some differences among the histograms for different categories.

viii. Edge-turn histogram features: These were found to be useful, but have been superseded by contour features, and edge curvature features.

3.2 Classifier

The classification of fragments according to marking type takes place in two stages, as illustrated in FIGS. 12A-12D and 13. As more particularly shown in FIGS. 12A-12D, a two-stage classifier 1200 includes in its first stage 1202, a plurality of first stage classifiers 1202a, 1202b . . . 1202n. In the first stage, each fragment is classified solely on the basis of features described above in Section 3.1. This results in each fragment having a per-category score. So in the case of FIGS. 12A-12D, image fragments 1204a are supplied to particular feature vectors 1206a (as will be shown in more detail in FIG. 13). If the classifier 1200 stopped here the category with the highest score could be assigned for each fragment.

But as can be seen by the use of classifiers 1202a and 1202n, in embodiments of the present application, the classification is refined by taking into consideration the surrounding context, and how the spatial neighbors are classified. Wherein neighborhood fragments 1204b . . . 1204n are provided to corresponding feature vectors 1206b . . . 1206n. The results of these operations in the form of category scores 1208a, and accumulated category scores 1208b . . . 1208n are supplied, along with the feature vector 1202a, to an augmented feature vector 1210, for use by second stage classifier 1212 of the two stage classifier 1200, to provide this refined output by reclassifying the image fragments 1204a by taking into consideration all the features used in the first stage 1202a, and also the likely category (secondary feature) labels of neighborhood fragments 1204b . . . 1204n. The output from the second stage classifier 1212 providing final category scores 1214. The final category score from classifier 1212 is then used by the systems and methods of the present application to apply a label (such as a color, a grey tone, or other marking or indicator) to the segment of the image by a labeling module 650. In one embodiment, labeling module is understood to be the appropriate components of the system described in FIG. 3.

The discussed secondary features are named and measured as accumulations of first-stage category-scores of all fragments with bounding boxes contained in the following spatial neighborhoods of the fragment's bounding box:

i. Horizontal Strip: Within ±16 pixels of fragment in y, and ±160 pixels of the fragment in x.
ii. Vertical Strip: Within ±16 pixels of fragment in x, and ±160 pixels of the fragment in y.
iii. Rectangular Neighborhood: Within ±160 pixels of fragment in both x and y directions.

The neighborhood sizes are fairly arbitrary except in certain embodiments they are chosen to be less than one character height (e.g., 16 pixels) and several character heights (e.g., 160 pixels) based on 300 dpi, 12 point font. They can be adjusted according to application context, e.g., scan resolution. Thus the present methods and systems are tunable to particular implementations.

It is mentioned there is a subtle but important difference of purpose between the secondary features and first-stage features that also consider neighborhood content (e.g., regularity features). The secondary features establish a relationship among category-labels of neighborhood fragments, while the first-stage features measure relationships among fragments and their observable properties. Consider, for example, the regularity features. The height-regularity feature measures how frequent the fragment height is in the neighborhood. This takes into account the other fragments in the neighborhood, but not what the likely categories of these fragments are. Thus, if $s_i$ represents the $i^{th}$ fragment, $u_i$ are the features measured on that fragment, and $c_i$ is that fragments category, then the classifier trained on the first stage features establishes:

$$p(c_i|u_i;j\epsilon neighborhood(i)).$$

In contrast, the secondary features enable a dependency of the form:

$$p(c_i|c_j;j\epsilon neighborhood(i)).$$

Thus the secondary features address the issue of inter-label dependence.

Zheng et al. constructed a Markov Random Field to address this issue. The present approach is different. Here a neighborhood for each node (fragment) is defined, and the fragment label is allowed to depend on the neighborhood labels. The pattern of dependence is guided by the choice of neighborhoods, but a preconceived form of dependence is not enforced. Rather the dependence, if significant, is learned from training data; the neighborhood features are made available to the second stage classifier learner and are selected if they are found useful for classification. Further, this formulation sidesteps loopy message propagation or iterative sampling inference which may have compute-time and convergence problems.

Figure 13:
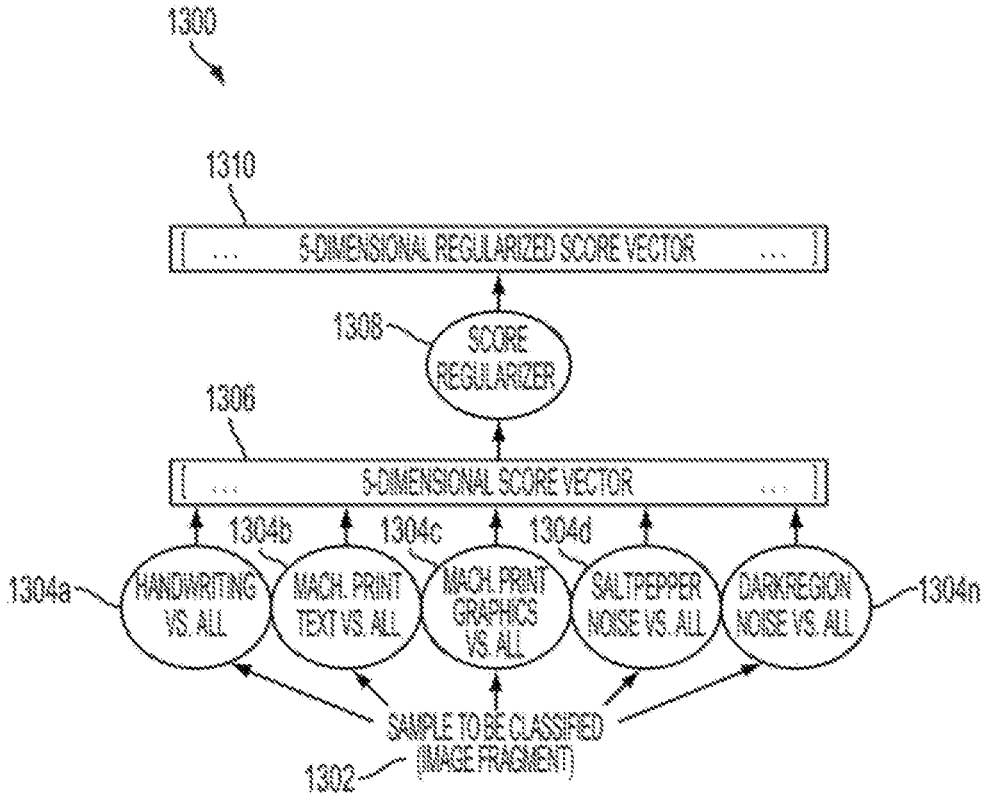
FIG. 13 shows one embodiment of the classifier which may be used in configuring the two-stage classifier of FIGS. 12A-12D.

The two stage classifier is constructed by using the basic classifier explained in FIG. 13. In the first stage 1202a . . . 1202n the basic classifier is applied to categorize fragments based on features described above in Section 3.1. The results of categorization are aggregated for the whole image into the secondary features 1208a . . . 1208n. These secondary features and the initial features (1206a) are together used by another basic classifier (i.e., second stage classifier 1210) in the second stage to arrive at the final categorization numbers.

3.3 The Basic Classifier

In one embodiment the basic classifier used in each stage is a collection of one vs. all classifiers—one per category. This classifier type takes as input a vector of features, and produces an array of scores—one per category. This output array is then used to pick the best scoring category, or apply various rejection/acceptance thresholds.

With continuing attention to FIG. 13, classifier 1300 may be understood as the type of classifier employed for each of the classifiers of FIGS. 12A-12D. In this embodiment, classifier 1300 is implemented as one vs. all type classifier implemented as weighted sum of weak classifiers, where each weak classifier is a single threshold test on one of scalar features measured on a fragment (e.g., one dimension of the feature vector). More particularly, an image fragment 1302 is supplied to each of the feature vectors 1304a . . . 1304n. Output from these vectors are passed to a multi-dimensional score vector (e.g., 5-dimensional score vector) 1306. This output is then passed to a score regulator 1308, which provides its output to a multi-dimensional regularized score vector (e.g., 5-dimensional regularized score vector) 1310.

This design set up permits extremely fast classification. For example in a classifier with a combination of 50 weak classifiers amounts to about 50 comparisons, multiplications, and additions for each fragment.

Each weak classifier produces a number that is either +1 or −1 indicating the result of the comparison test. The weighted sum of these is then a number between +1 and −1, nominally indicating positive classification if the result is positive. The output of the basic classifier is then an array of numbers, one per category. A positive result nominally indicates a good match to the corresponding category. Typically, but not always, only one of these numbers will be positive. When more than one number is positive, the fragment may be rejected as un-assignable, or the system may be designed to pick the highest scorer. Similarly, it may be necessary to arbitrate when no category returns a positive score to claim a fragment. One strategy is to feed the category-score vector to another classifier, which then produces refined category scores. This is especially useful if this second stage classifier can also be learned automatically from data. The second classifier stage which, in some embodiments has adapted this approach may be thought of as a score regularizer.

Thus the basic classifier itself may be thought of as a two stage classifier, with a number of one-vs.-all classifiers feeding into a score regularizer. This is not to be confused with the larger two stage approach where neighborhood information is integrated at the second stage. In fact, as previously mentioned, the two stage classifier is implemented by using this same basic classifier structure, but with different parameters because the second stage classifier works on an augmented feature. Therefore, preliminary category assignments are revised based on statistics of category assignments made to neighboring fragments.

Figure 14:
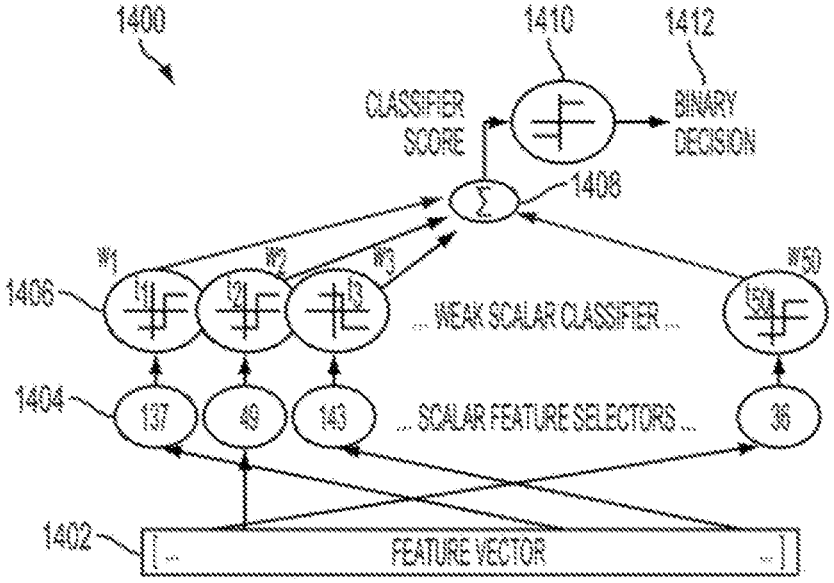
FIG. 14 is a schematic of a weighted sum classifier that is obtained by Adaboost used for each one-vs-all classifiers in one embodiment.

As depicted in FIG. 14 the basic one-vs.-all classifiers, and the score regularizer 1400 may in one embodiment be trained using the machine learning algorithm Adaptive Boosting (i.e., Adaboost). In FIG. 14, a feature vector 1402 is provided to scalar feature selectors 1404a . . . 1404n, which provide their output to weak scalar classifiers 1406a . . . 1406n. The material is summed at summer 1408 and scored 1410 to obtain a binary decision 1412. In operation both, the weak-learner considers one feature dimension/vector 1402 at a time, and finds the threshold test (scalar feature selectors) 1404 that minimizes the weighted error on the training data (weak scalar classifier) 1406. The most discriminative of these feature dimensions is then picked as the next weak classifier (1408,1410,1412). This process is then repeated through Adaboost iterations. By this construction parameters of the classifier are obtained by discriminative Adaboost training that selects useful features from among a family of hundreds of measurements and assigns relative weights to the features.

This particular form of Adaboosting classifier learners has recently been found to be very effective in categorizing document images on a few Xerox Global Services client application data sets. A discussion of Adaboost is set out in Freund et al., "A Decision-Theoretic Generalization Of On-Line Learning And An Application To Boosting," in European Conference On Computational Learning Theory, pages 23-37, 1995, hereby incorporated herein by reference in its entirety.

4. Image Processing Flow Diagram

Figure 15:
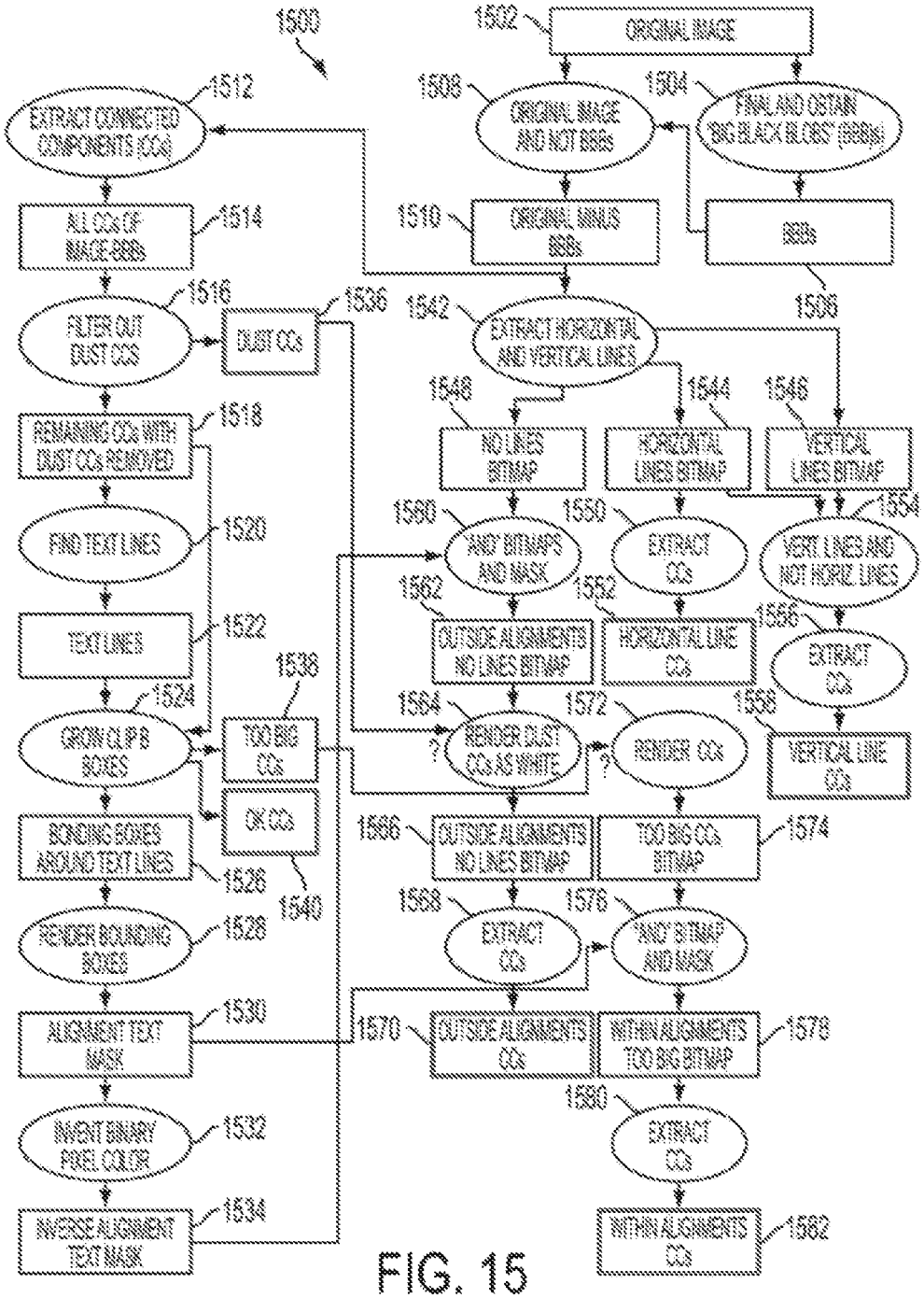
FIG. 15 is a more detailed flow chart of a process incorporating the concepts of the present application.

A more detailed description of the process of FIG. 4 is shown in by process 1500 of FIG. 15. In this flow diagram there is interaction between image-based representations which are good for bitwise logical operations such as masking, and symbolic representations which are good for grouping and applying logic and rules to geometrical properties. Similar to FIG. 4 one particular aspect of process 1500 is the creation of various image masks. Therefore, in the following discussion generally the various processing steps on the left-hand side of FIG. 15 are directed toward generating such masks in addition to further processing, while the processing steps on the right hand side of the figure are directed to image processing operations using the masks. Process 1500 thus provides a mixture of image processing operations and symbolic operations that work on a token, such as the connected component (CC) objects.

With a more detailed look at process 1500, an original image 1502 is investigated to find and obtain areas of the image which meet a predetermined definition of large areas of dark/black material (e.g., also called herein "big black blobs" or BBBs) 1504. An "AndNot" operation 1508 is preformed on the original image and the BBBs, where the BBBs sections are removed from the original image 1510.

Original image minus BBBs is operated on so that the connected components (CCs) in the remaining image are extracted 1512, creating an image with all CCs being identified 1514. A filtering operation is performed 1516, wherein small dimensioned CCs (sometimes called dust or spec CCs due to their small size) are removed, resulting in the remaining CCs being the non-dust CCs 1518.

This image of non-dust CCs, has a text line determining process applied to find text lines 1520. In one embodiment this text line process may be accomplished by process 800 of FIG. 8. The resulting image of text lines 1522 is then processed to generate bounding boxes (i.e., bounding boxes are grown) 1524 at the locations where text lines of the image (i.e., step 1522) are located. This results in identification of bounding box locations that encompass the determined text line locations 1526. The bounding boxes are rendered 1528, thereby generating an alignment text mask 1530. An invert binary pixel color operation 1532 is applied to the alignment text mask whereby the binary pixels of the mask are inverted (i.e., the colors are inverted) to generate an inverse alignment text mask 1534.

The foregoing operations have therefore created an alignment text mask 1530 and an inverse alignment text mask 1534, which are used in later image processing steps.

Returning attention to the filtering operation of 1516 the dust or spec connected components (CCs) are shown at 1536. The "dust CCs" is shown as a double-line box. The double-line box is intended to represent a final complete set of image material from the original image 1500, which at this point is intended to be interpreted as different types of objects, where the system or process believes text images may exist.

Next, with attention to growing of the bounding boxes 1524, there will be instances when some identified CCs are determined to be too big to be included as a text line with a bounding box 1538, as opposed to the CCs determined to be of an appropriate size 1540. The "OK CCs" 1540 are shown as a double-line box. The double-line box is intended to represent a final complete set of an image material from the original image 1500, where it is believed text images may exist.

Turning now to the right-hand side of the process flow, the image processing operations of process 1500, which will use the masks and of data generated by the previous processing will now be addressed in more detail.

Returning to the original image minus the BBBs 1510, this image is provided to an extraction process to extract and separate horizontal lines and vertical lines 1542. More particularly, this process identifies a bitmap having just horizontal lines 1544, a bitmap with just vertical lines 1546, and a bitmap having no lines 1548.

The horizontal lines bitmap 1544 is operated on to extract the connected components (CCs) of the bitmap 1550, and a horizontal line image of connected components (CC's) is generated. Vertical line bitmap 1546 is processed in a different manner than the horizontal line bitmap, wherein an "AndNot" logical operation is performed on the pixels of the vertical lines bitmap and the horizontal lines bitmap 1544. This operation takes the vertical CCs and minuses out any horizontal CCs. The remaining vertical connected components (CCs) are extracted 1556, resulting in vertical line image of connected components (CCs).

The "Horizontal Line CCs image" 1552 and the "Vertical Line CCs image" 1558 are shown as a double-line boxes. The double-line boxes are intended to represent a final complete set of an image material from the original image 1500, where it is believed text images may exist.

Returning now to the no-lines bitmap 1548, this image is "Anded" in a bitwise manner with the inverted alignment text mask (of 1534) 1560. This operation identifies a no-lines bitmap which is outside of the alignment of the previously determined text lines 1562. To clean up this image, the dust CC's of 1536 are provided for an operation where the dust CC's are rendered as white (i.e., they are turned into background material) 1564. This cleaned-up bitmap of outside alignment material 1566 then has its connected components (CC's) extracted 1568, resulting in a finalized image of connected components which are aligned outside of the predetermined text lines range 1570. The "Outside Alignments CCs" 1570 is shown as a double-line box. The double-line box is intended to represent a final complete set of image material from the original image 1500, where it is believed text images may exist.

Turning to step 1572, the Too Big CCs of 1538 are rendered, forming a Too Big CCs bitmap 1574, which is then "Anded" in a bitwise manner with alignment text mask (of 1530) 1576. The Anding operation generates a too big bitmap within the area of the image defined as alignment of text material 1578, which then has its CCs extracted 1580, whereby an image of too big CCs within the alignment areas is generated 1582.

By the operation of process 1500, final complete sets of image material (e.g., fragment or connected components) from the original image are generated which are now interpreted as different types of objects (i.e., small specs of the images) 1536, CCs believed to be text images (OK CCs) 1540, horizontal line CCs 1552, vertical line CCs 1558, CCs determined or believed to be outside of the text line alignments 1570, and CCs determined or believed to be within the text line alignment range 1582.

The concepts described herein permit annotation detection and marking classification systems to work at a level smaller than connected components, thereby allowing for the methods and systems to separate annotations that touch printed material.

This method does not cause spurious over fragmentation of fragments that occur within text lines, and this approach is relatively scale-independent and is not overly dependent on determining whether a connected component is text or not based on its size.

Another aspect of the present methods and systems is that it produces features that are useful in classifying fragments. Specifically, the alignments of contour extrema are themselves useful for later classification. Contour extrema that align very well are more likely to be machine printed, while contour extrema that align only moderately well are more likely to come from handwritten text.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of classifying marking types on images of a document, the method comprising:

supplying the document containing the images to a segmenter;

segmenting the images received by the segmenter *into fragments, the segmenting* including identifying neatly written or printed text by grouping selected feature points along predetermined orientations, the feature points including local extrema of bounding contours of connected components, and subtracting enclosing boundary boxes of text lines from remaining document material to fragment connected components that are part of the text lines and part of extraneous markings;

supplying the fragments to a *two-stage* classifier, the *two-stage* classifier providing *a plurality of first classifiers generating* a *first* category score *and a second classifier generating a second category score* to each fragment, wherein the *two-stage* classifier is trained from groundtruth images whose pixels are labeled according to known marking types, *wherein the first category score is generated as an array of scores for the each fragment, and the second category score is provided by reclassifying the each fragment by considering a neighborhood fragment of the each fragment, and wherein the first and second category scores to each of the fragments are generated by:*

*determining feature measurements for the each fragment, the feature measurements including measuring a segmenter feature, a size feature, a location feature, a regularity feature, an edge curvature feature, a contour feature, a run length feature, and an edge-turn histogram feature, and*

*determining the first and second category scores for the each fragment by applying the two-stage classifier to the determined feature measurements*; and assigning a same label to all pixels in a fragment when the fragment is classified by the *two-stage* classifier.

2. The method according to claim 1 wherein the segmenting of the [image lines] *images* is directed to segregation of the text lines believed to be aligned text, from other aspects of the images.

3. The method according to claim 1, wherein the document images are electronic images stored in an electronic memory and are segmented by a processor associated with the electronic memory.

4. A method of classifying marking types on images of a document, the method comprising:

supplying the document containing the images to a segmenter;

segmenting the images received by the segmenter *into fragments, the segmenting* including identifying neatly written or printed text by grouping selected feature points along predetermined orientations, the feature points including local extrema of bounding contours of connected components, and subtracting enclosing boundary boxes of text lines from remaining document material to fragment connected components that are part of the text lines and part of extraneous markings;

supplying the fragments to a *two-stage* classifier, the *two-stage* classifier providing *a plurality of first classifiers generating* a *first* category score *and a second classifier generating a second category score* to each fragment, wherein the *two-stage* classifier is trained from groundtruth images whose pixels are labeled according to known marking types, *wherein the first category score is generated as an array of scores for the each fragment, and the second category score is provided by reclassifying the each fragment by considering a neighborhood fragment of the each fragment, and wherein the first and second category scores to the each fragment are generated by:*

*determining feature measurements for the each fragment, the feature measurements including measuring*

*a segmenter feature, a size feature, a location feature, a regularity feature, an edge curvature feature, a contour feature, a run length feature, and an edge-turn histogram feature, and*

*determining the first and second category scores for the each fragment by applying the two-stage classifier to the determined feature measurements*; and assigning a same label to all pixels in a fragment when the fragment is classified by the *two-stage* classifier;

wherein the segmenting includes processing the images to find text lines, the processing comprising:

detecting upper and lower extrema of the connected components;

identifying upper and lower contour extrema of the detected upper and lower extrema of the connected components;

grouping the identified upper and lower contour extrema;

identifying upper contour point groups and lower contour point groups;

fitting the grouped upper and lower point groups;

filtering out the fitted and grouped upper and lower point groups that are outside a predetermined alignment threshold;

forming upper and lower alignment segments for the upper and lower point groups that remain after the filtering operation;

matching as pairs the upper and lower segments that remain after the filtering operation; and forming text line bounding boxes based on the pairs of matched upper and lower segments that remain after the filtering operation, the bounding boxes identifying connected components believed to be aligned text.

5. A system of classifying marking types on images of a document, the system comprising:

a segmenter operated on a processor and configured to receive the document containing the images, the segmenter segmenting the images into fragments of foreground pixel structures that are identified as being likely to be of the same marking type by finding connected components, and dividing at least some of the connected components to obtain image fragments, the connected components being isolated, continuous regions of foreground pixels, the segmenter segmenting the images by:

identifying neatly written or printed text by grouping selected feature points along predetermined orientations, the feature points being local extrema of bounding contours of the connected components; and subtracting enclosing boundary boxes of text lines from remaining document material to fragment connected components that are partly part of the text lines and partly part of extraneous markings; and a *two-stage* classifier operated on a processor and configured to receive the fragments, the *two-stage* classifier providing *a plurality of first classifiers generating* a *first* category score *and a second classifier generating a second category score* to each received fragment, wherein the *two-stage* classifier is trained from ground truth images whose pixels are labeled according to known marking types, *wherein the first category score is generated as an array of scores for the each fragment, and the second category score is provided by reclassifying the each fragment by considering a neighborhood fragment of the each fragment, and wherein the first and second category scores to the each fragment are generated by:*

*determining feature measurements for the each fragment, the feature measurements including measuring a segmenter feature, a size feature, a location feature, a regularity feature, an edge curvature feature, a contour feature, a run length feature, and an edge-turn histogram feature, and*

*determining the first and second category scores for the each fragment by applying the two-stage classifier to the determined feature measurements,* the *two-stage* classifier assigning a same label to all pixels in a fragment when the fragment is classified by the *two-stage* classifier.

6. The system according to claim 5 wherein the segmenter is further configured to find text lines including:

detecting upper and lower extrema of the connected components;

identifying the upper and lower contour extrema of the detected upper and lower extrema of the connected components;

grouping the identified upper and lower contour extrema;

identifying upper contour point groups and lower contour point groups;

fitting the grouped upper and lower point groups;

filtering out the fitted and grouped upper and lower point groups that are outside a predetermined alignment threshold;

forming upper and lower alignment segments for the upper and lower point groups that remain after the filtering operation;

matching as pairs the upper and lower segments that remain after the filtering operation; and forming text line bounding boxes based on the pairs of matched upper and lower segments that remain after the filtering operation, the bounding boxes identifying connected components believed to be aligned text.

7. The method according to claim 5, wherein the document images are electronic images stored in an electronic memory and are segmented by a processor associated with the electronic memory.

8. The system according to claim 5 further including a scanner to receive a hardcopy document containing images, the scanner converting the hardcopy document into an electronic document, the electronic document being the document supplied to the segmenter.

9. The method according to claim 1, wherein the connected components are each an isolated, continuous region of foreground pixels, and wherein at least one of the fragments is a subset of one of the connected components.

10. The method according to claim 1, wherein the segmenting includes:

grouping the selected feature points into strips;

fitting lines to the strips; and forming the enclosing bounding boxes from pairs of fitted lines.

11. The method according to claim 1, further including:

training the classifier from the groundtruth images using a machine learning algorithm.

[12. The method according to claim 1, further including:

providing the category score to each of the fragments by:

determining feature measurements for the fragment;

determining the category score for the fragment by applying the classifier to the determined feature measurements.]

13. The method according to claim 1, wherein the segmenting includes:

determining the enclosing boundary boxes for individual text lines based on the grouping.

14. The system according to claim 5, wherein the segmenting includes:

grouping the selected feature points into strips;

fitting lines to the strips; and forming the enclosing bounding boxes from pairs of fitted lines.

15. The system according to claim 5, wherein the segmenter segments the images by further:

determining the enclosing boundary boxes for individual text lines based on the grouping.

[16. The system according to claim 5, wherein the classifier provides the category score to each received fragment by:

determining feature measurements for the fragment; and determining the category score for the fragment by applying the classifier to the determined feature measurements.]

*17. A method of classifying marking types of one or more images of an electronic document, comprising:*

*receiving an electronic document containing one or more images;*

*segmenting the one or more images by grouping selected feature points of the one or more images along predetermined orientations into a plurality of segments;*

*supplying the plurality of segments to a two-stage classifier, the two-stage classifier providing a plurality of first classifiers generating a first category score and a second classifier generating a second category score to each segment, wherein the two-stage classifier is trained from groundtruth images whose pixels are labeled of known marking types, wherein the first category score is generated as an array of scores for the each fragment, and the second category score is provided by reclassifying the each fragment by considering a neighborhood segment of the each segment, and wherein the first and second category scores to the each fragment are generated by:*

*determining feature measurements for the each fragment, the feature measurements including measuring a segmenter feature, a size feature, a location feature, a regularity feature, an edge curvature feature, a contour feature, a run length feature, and an edge-turn histogram feature, and*

*determining the first and second category scores for the each fragment by applying the two-stage classifier to the determined feature measurements; and*

*assigning a same label to all pixels in a segment when the segment is classified by the two-stage classifier.*

*18. The method of claim 17, further comprising training the two-stage classifier from the groundtruth images using a machine learning algorithm.*

*19. The method of claim 17, wherein the segmenting includes: determining enclosing boundary boxes for individual text lines based on the grouping.*

*20. A method of classifying marking types on images of an electronic document, comprising:*

*receiving an electronic document containing one or more images;*

*segmenting the one or more images received by grouping selected feature points along predetermined orientations into a plurality of segments;*

*supplying the segments to a two-stage classifier, the two-stage classifier providing a plurality of first classifiers generating a first category score and a second classifier generating a second category score to each segment, wherein the two-stage classifier is trained from groundtruth images whose pixels are labeled of known marking types, wherein the first category score is generated as an array of scores for the each fragment, and the second category score is provided by reclassifying the each fragment by considering a neighborhood segment of the each segment, and wherein the first and second category scores to the each fragment are generated by:*

*determining feature measurements for the each fragment, the feature measurements including measuring a segmenter feature, a size feature, a location feature, a regularity feature, an edge curvature feature, a contour feature, a run length feature, and an edge-turn histogram feature, and*

*determining the first and second category scores for the each fragment by applying the two-stage classifier to the determined feature measurements; and*

*assigning a same label to all pixels in a segment when the segment is classified by the two-stage classifier;*

*wherein the segmenting includes processing the images to find text lines, the processing comprising:*

*detecting upper and lower extrema of the connected components;*

*identifying upper and lower contour extrema of the detected upper and lower extrema of the connected components;*

*grouping the identified upper and lower contour extrema;*

*identifying upper contour point groups and lower contour point groups;*

*fitting the grouped upper and lower point groups;*

*filtering out the fitted and grouped upper and lower point groups that are outside a predetermined alignment threshold;*

*forming upper and lower alignment segments for the upper and lower point groups that remain after the filtering operation;*

*matching as pairs the upper and lower segments that remain after the filtering operation; and*

*forming text line bounding boxes based on the pairs of matched upper and lower segments that remain after the filtering operation, the bounding boxes identifying connected components believed to be aligned text.*

*21. A system of classifying marking types of one or more images of an electronic document, comprising:*

*a segmenter operated on a processor that receives an electronic document containing one or more images, the segmenter segmenting the one or more images by grouping selected feature points along predetermined orientations; and*

*a two-stage classifier operated on the processor that:*

*receives the segments, the two-stage classifier providing a plurality of first classifiers generating a first category score and a second classifier generating a second category score to each segment, wherein the two-stage classifier is trained from groundtruth images whose pixels are labeled of known marking types, wherein the first category score is generated as an array of scores for the each fragment, and the second category score is provided by reclassifying the each fragment by considering a neighborhood segment of the each segment, and wherein the first and second category scores to the each fragment are generated by:*

*determining feature measurements for the each fragment, the feature measurements including measuring a segmenter feature, a size feature, a location feature, a regularity feature, an edge curvature feature, a contour feature, a run length feature, and an edge-turn histogram feature, and*

*determining the first and second category scores for the each fragment by applying the two-stage classifier to the determined feature measurements, and*

*assigns a same label to all pixels in a segment when the segment is classified by the two-stage classifier.*

*22. The system of claim 21, wherein the one or more images are electronic images stored in an electronic memory and are segmented by a processor associated with the electronic memory.*

*23. The system of claim 21, further comprising a scanner to:*

*receive a hardcopy document containing images; and*

*convert the hardcopy document into an electronic document, wherein the electronic document is supplied to the segmenter.*

*24. The system of claim 21, wherein the segmenter segments the one or more images by further: determining enclosing boundary boxes for individual text lines based on the grouping.*

*25. An apparatus to classify marking types of one or more images of an electronic document, comprising:*

*a two-stage segmenter-classifier that:*

*receives an electronic document containing one or more images;*

*segments the one or more images by grouping selected feature points of the one or more images along predetermined orientations into a plurality of segments;*

*provides a plurality of first classifiers generating a first category score and a second classifier generating a second category score to each segment, wherein the two-stage segmenter-classifier is trained from ground-truth images whose pixels are labeled of known marking types, wherein the first category score is generated as an array of scores for the each fragment, and the second category score is provided by reclassifying the each fragment by considering a neighborhood segment of the each segment, and wherein the first and second category scores to the each fragment are generated by:*

*determining feature measurements for the each fragment, the feature measurements including measuring a segmenter feature, a size feature, a location feature, a regularity feature, an edge curvature feature, a contour feature, a run length feature, and an edge-turn histogram feature, and*

*determining the first and second category scores for the each fragment by applying the two-stage classifier to the determined feature measurements; and*

*assigns a same label to all pixels in a segment when the segment is classified by the two-stage segmenter-classifier; and*

*a scanner, communicatively coupled to the two-stage segmenter-classifier, that:*

*receives a hardcopy document containing one or more images,*

*converts the hardcopy document into an electronic document,*

*supplies the electronic document to the two-stage segmenter-classifier.*

* * * * *